US010689217B2

(12) United States Patent
Kunai et al.

(10) Patent No.: US 10,689,217 B2
(45) Date of Patent: Jun. 23, 2020

(54) FILM ROLL, METHOD OF PRODUCING THE SAME, AND METHOD OF TESTING THE SAME

(71) Applicant: Sumitomo Chemical Company, Limited, Tokyo (JP)

(72) Inventors: Mariko Kunai, Niihama (JP); Hiroko Nakashima, Niihama (JP); Daizaburo Yashiki, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 795 days.

(21) Appl. No.: 15/177,722

(22) Filed: Jun. 9, 2016

(65) Prior Publication Data
US 2016/0362269 A1 Dec. 15, 2016

(30) Foreign Application Priority Data

Jun. 11, 2015 (JP) .................................. 2015-118698
Jan. 27, 2016 (JP) .................................. 2016-013669

(51) Int. Cl.
*B65H 18/28* (2006.01)
(52) U.S. Cl.
CPC ................................... *B65H 18/28* (2013.01)
(58) Field of Classification Search
CPC ...... B65H 18/28; B65H 75/148; B65H 75/28; B65H 2701/378; B65H 2701/515; G11B 23/107
See application file for complete search history.

(56) References Cited

U.S. PATENT DOCUMENTS

| 4,589,601 | A | * | 5/1986 | Scherer | .................. | B65H 75/00 242/159 |
| 6,033,801 | A | | 3/2000 | Casais | | |
| 8,157,198 | B2 | * | 4/2012 | Shiga | ................... | G11B 23/107 242/332.4 |
| 8,177,158 | B2 | * | 5/2012 | Ishikawa | .............. | G11B 23/107 242/348 |
| 2003/0098386 | A1 | * | 5/2003 | Hashimoto | ............ | B65H 75/14 242/613.1 |

(Continued)

FOREIGN PATENT DOCUMENTS

CN    1768396 A      5/2006
CN    202076356 U   12/2011
(Continued)

OTHER PUBLICATIONS

Office Action dated Jan. 10, 2017 in JP Application No. 2016-013669.

(Continued)

*Primary Examiner* — William A. Rivera
(74) *Attorney, Agent, or Firm* — Panitch Schwarze Belisario & Nadel LLP

(57) ABSTRACT

An inclination of an outer circumferential surface of a film roll with respect to a widthwise axis is restricted. The roll includes: an outer cylinder part having a material thickness that is smaller toward a negative side of a y-axis than it is toward a positive side of the y-axis; and a slit separator which is wound around an outer circumferential surface of the outer cylinder part and which has a thickness that is larger toward the negative side of the y-axis than it is toward the positive side of the y-axis.

8 Claims, 15 Drawing Sheets

(56) References Cited

U.S. PATENT DOCUMENTS

| | | | | |
|---|---|---|---|---|
| 2004/0079833 A1* | 4/2004 | Romagnoli | .......... | D06B 23/042 |
| | | | | 242/613.1 |
| 2005/0023394 A1* | 2/2005 | Fujii | .................. | G11B 23/043 |
| | | | | 242/338.1 |
| 2006/0043227 A1* | 3/2006 | Iino | ..................... | G11B 23/037 |
| | | | | 242/348 |
| 2007/0009776 A1 | 1/2007 | Nodono | | |
| 2008/0265078 A1* | 10/2008 | Shiga | .................. | B65H 75/148 |
| | | | | 242/348.3 |
| 2015/0280194 A1* | 10/2015 | Mitsuoka | ................. | C08J 5/18 |
| | | | | 429/254 |
| 2016/0362269 A1 | 12/2016 | Kunai et al. | | |

FOREIGN PATENT DOCUMENTS

| | | |
|---|---|---|
| JP | 2003197159 A | 7/2003 |
| JP | 2003285978 A | 10/2003 |
| JP | 2004296159 A | 10/2004 |
| JP | 2007016098 A | 1/2007 |
| JP | 2014231410 A | 12/2014 |
| JP | 2015030594 A | 2/2015 |
| JP | 2017001881 A | 1/2017 |
| WO | 2008013114 A1 | 1/2008 |

OTHER PUBLICATIONS

Office Action dated Sep. 3, 2019 in JP Application No. 2017112359 (Partial English Translation).
Office Action dated Mar. 31, 2020 in JP Application No. 2017112359 (Partial English Translation).

* cited by examiner

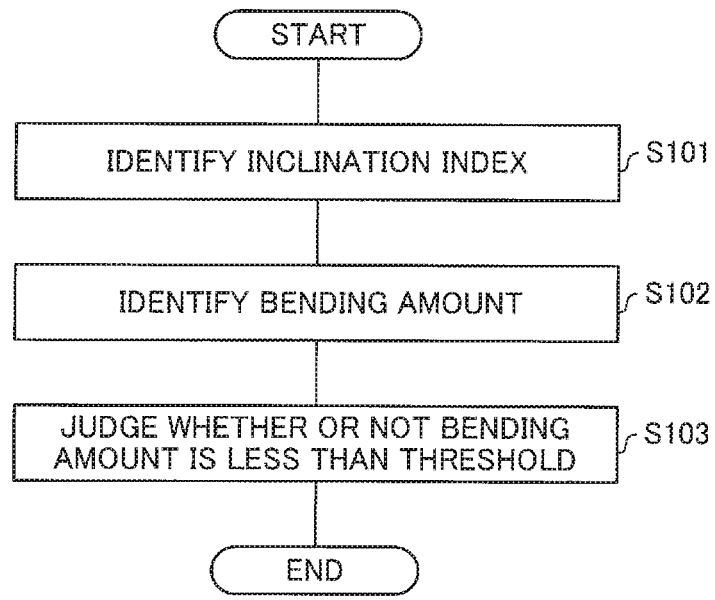
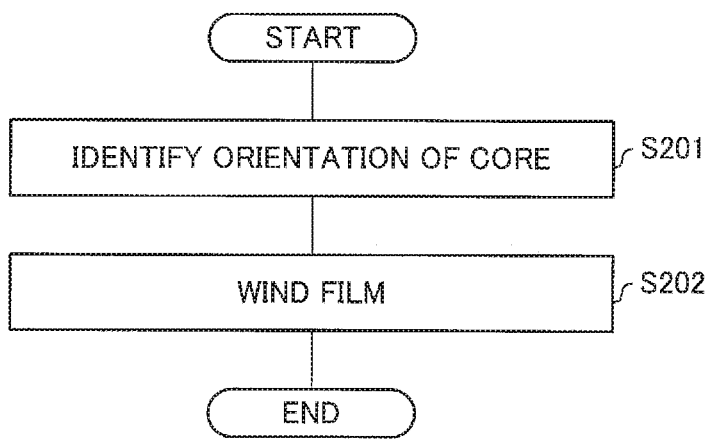

FILM ROLL, METHOD OF PRODUCING THE SAME, AND METHOD OF TESTING THE SAME

This Nonprovisional application claims priority under 35 U.S.C. § 119 on Patent Application No. 2015-118698 filed in Japan on Jun. 11, 2015 and on Patent Application No. 2016-013669 filed in Japan on Jan. 27, 2016, the entire contents of which are hereby incorporated by reference.

TECHNICAL FIELD

The present invention relates to (i) a roll in which a film is wound around a prescribed material, (ii) a method of producing the roll, and (iii) a method of testing the roll.

BACKGROUND ART

Patent Literature 1 discloses a technology concerning a roll body (hereinafter referred to as "roll") in which a polyolefin microporous film (hereinafter referred to as "microporous film") is wound around a winding core (hereinafter referred to as "core"). According to the technology disclosed in Patent Literature 1, the microporous film is wound around the core so that an absolute value of a difference between a calculated thickness of the microporous film and an actual thickness of the microporous film is a prescribed value or less, which calculated thickness is calculated based on (i) an outer diameter of the roll, (ii) an outer diameter of the core, and (iii) a length of the microporous film wound around the core. This is believed to configure the roll so that the microporous film is neither loose nor excessively tight.

CITATION LIST

Patent Literature

[Patent Literature 1]
PCT International Publication WO2008/013114 (Publication Date: Jan. 31, 2008)

SUMMARY OF INVENTION

Technical Problem

In general, a microporous film such as that of Patent Literature 1 is formed by obtaining a plurality of slit films with a prescribed width through (i) preparing an original sheet film having a wide width and then (ii) slitting the original sheet along a lengthwise axis. The original sheet film may have a thickness distribution with respect to a widthwise axis. Note that "widthwise axis" refers to an axis perpendicular to the lengthwise axis and a thicknesswise axis of a slit film.

Part of a thickness distribution of the original sheet is reflected in each of the slit films formed by slitting the original sheet film having the thickness distribution with respect to the widthwise axis. Even in a case where there is waviness in thickness distribution of the original sheet film with respect to the widthwise axis, the following is still true if the width of a slit film with respect to the waviness is sufficiently small: As far as each single slit film is concerned, a thickness monotonically changes with respect to the widthwise axis. That is, a thickness monotonically increases or decreases from one side to the other side with respect to the widthwise axis.

In a case where the thickness distribution is accumulated, an outer circumferential surface of a roll in which such a slit film is wound around a core becomes inclined by a relatively large amount with respect to a center axis of the core, that is, from one side to the other side along a widthwise axis.

A roll, in which an outer circumferential surface is thus inclined, not only has a substandard appearance as a product but also may be subjected to a plastic deformation of a part having a large thickness. This may cause an adverse effect on the product quality of a slit film. For example, the plastic deformation may cause meandering during a process of assembling a battery.

The present invention has been made in view of the problem, and it is an object of the present invention to provide (i) a film roll having an outer circumferential surface whose inclination with respect to a widthwise axis is restricted, (ii) a method of producing the film roll, (iii) a method of testing a film roll, which method is usable for restricting an inclination of an outer circumferential surface of the film roll with respect to a widthwise axis.

Solution to Problem

In order to attain the object, a film roll according to an aspect of the present invention includes: a cylindrical member having one end part and the other end part, the one end part being smaller in material thickness than the other end part; and a film which is wound around an outer circumferential surface of the cylindrical member, the film having a thickness that is larger toward the one end part than it is toward the other end part with respect to a widthwise axis.

A film roll according to another aspect of the present invention includes: a core having an outer circumferential surface that is cylindrically shaped, the outer circumferential surface being configured so that a force, which is applied to the outer circumferential surface so as to shorten a circumference of the outer circumferential surface, causes a circumference of one end part of the core to be shorter than a circumference of the other end part of the core; and a film which is wound around the outer circumferential surface of the core, the film having a thickness that is larger toward the one end part than it is toward the other end part with respect to a widthwise axis.

A film roll according to another aspect of the present invention includes: a core having an outer circumferential surface around which a film is to be wound; and a film which is wound around the outer circumferential surface of the core, the film having a thickness that is larger toward one end part of the core than it is toward the other end part of the core with respect to a widthwise axis, the outer circumferential surface of the core being configured so that a circumference of the one end part is shorter than a circumference of the other end part.

A film roll production method according to an aspect of the present invention is a method of producing a film roll, including the steps of: identifying an orientation of a cylindrical member having one end part and the other end part, the one end part being smaller in material thickness than the other end part; and winding a film around an outer circumferential surface of the cylindrical member, the film having a thickness that is larger toward the one end part than it is toward the other end part with respect to a widthwise axis.

A film roll production method according to another aspect of the present invention is a method of testing a film roll, said film roll including: a cylindrical member; and a film which is wound around the cylindrical member, said method including the steps of: identifying an inclination of an outer circumferential surface of the film roll with respect to a center axis of the cylindrical member; and judging, based on the inclination thus identified, whether or not the film roll is a non-defective product.

Advantageous Effects of Invention

According to each of the aspects of the present invention, an inclination of an outer circumferential surface of a film roll with respect to a widthwise axis is restricted. In addition, such a film roll can be produced. Furthermore, it is possible to test whether or not the film roll is a non-defective product.

BRIEF DESCRIPTION OF DRAWINGS

FIG. 12 is a flow chart illustrating a method of testing a roll, which method is based on the correlation illustrated in FIG. 11.

FIG. 13 is a flow chart illustrating a method of producing a roll according to Embodiment 3.

DESCRIPTION OF EMBODIMENTS

The following description will assume that a roll of the present invention is obtained by winding a lithium-ion secondary battery separator around a core. Therefore, a lithium-ion secondary battery, a separator, a heat-resistant separator, a heat-resistant separator production method, a slitting apparatus, and a cutting device will be described first in this order.

(Lithium-Ion Secondary Battery)

A nonaqueous electrolyte secondary battery, typified by a lithium-ion secondary battery, has a high energy density, and therefore is currently and widely used as (i) batteries for use in devices such as personal computers, mobile phones, and mobile information terminals, (ii) moving bodies such as automobiles and airplanes, and (iii) stationary batteries contributing to stable power supply.

Figure 1:
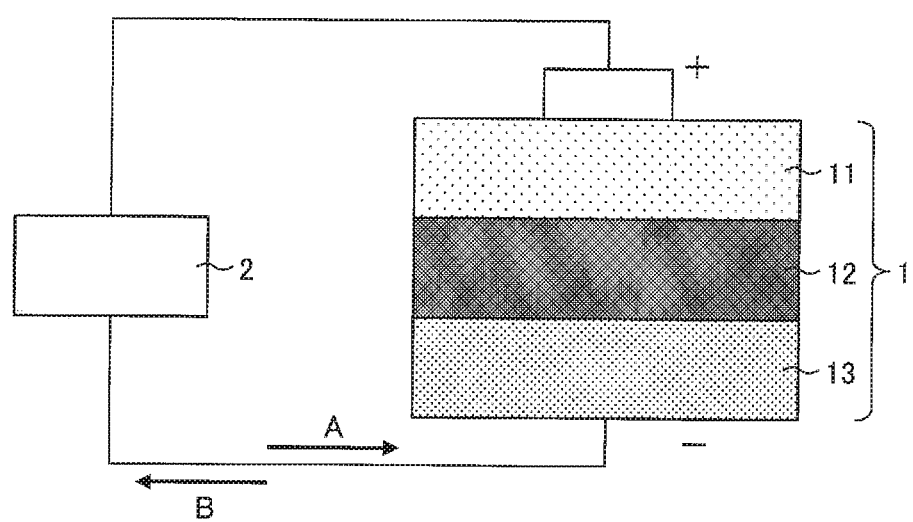
FIG. 1 is a view schematically illustrating a cross sectional configuration of a lithium-ion secondary battery.

FIG. 1 is a view schematically illustrating a cross sectional configuration of a lithium-ion secondary battery 1.

As illustrated in FIG. 1, the lithium-ion secondary battery 1 includes a cathode 11, a separator 12 (film), and an anode 13. Between the cathode 11 and the anode 13, an external device 2 is connected outside the lithium-ion secondary battery 1. This causes (i) electrons to move in a direction A while the lithium-ion secondary battery 1 is being charged and (ii) electrons to move in a direction B while the lithium-ion secondary battery 1 is being discharged.

(Separator)

The separator 12 is provided so as to be sandwiched between (i) the cathode 11 which is a positive electrode of the lithium-ion secondary battery 1 and (ii) the anode 13 which is a negative electrode of the lithium-ion secondary battery 1.

The separator 12 is a porous film which causes the cathode 11 and the anode 13 to be separated and allows lithium ions to move between the cathode 11 and the anode 13. Materials of the separator 12 include polyolefin such as polyethylene or polypropylene.

Figure 2:
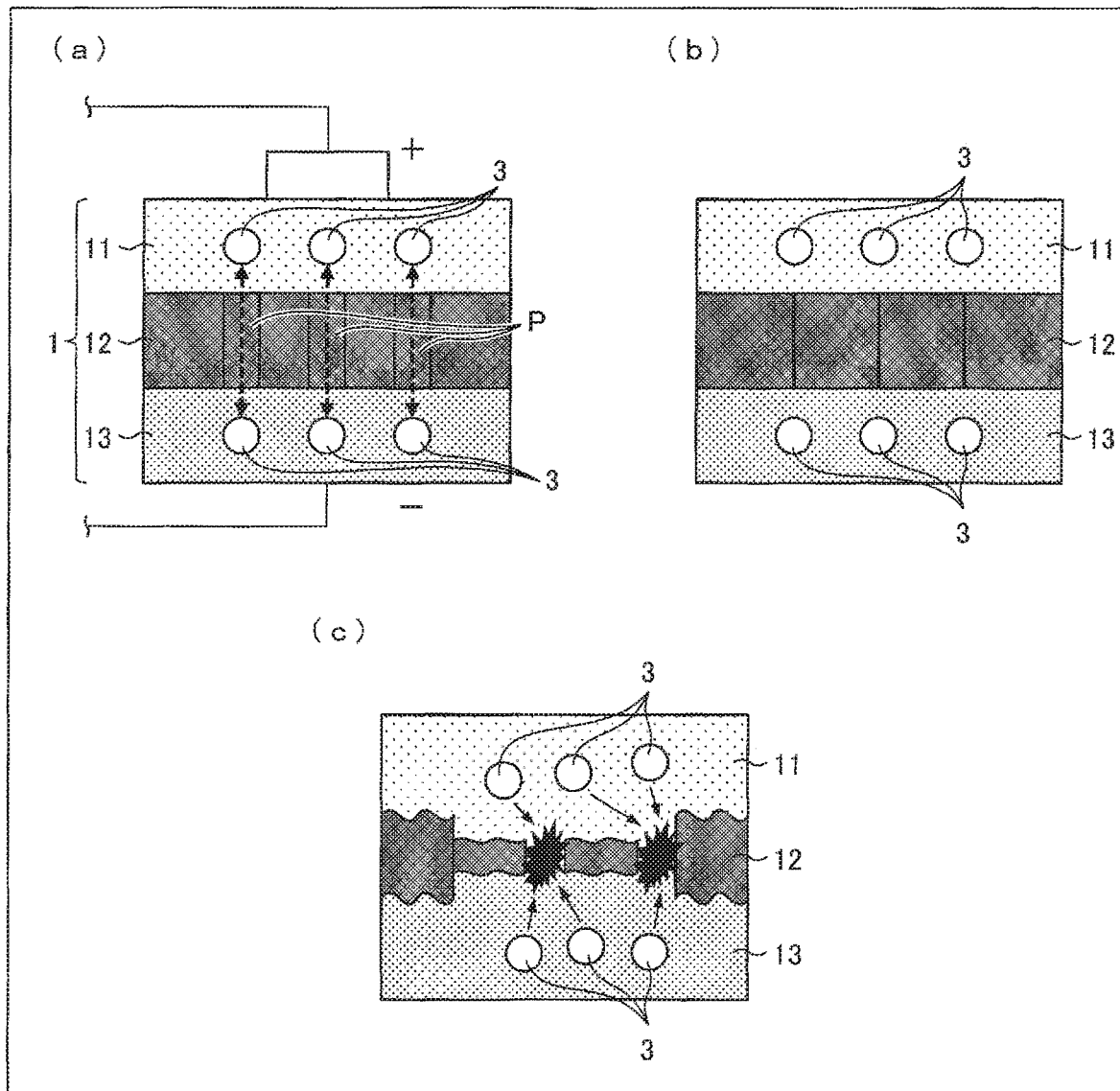
FIG. 2 is a set of views schematically illustrating details of the configuration of the lithium-ion secondary battery illustrated in FIG. 1.

FIG. 2 is a view schematically illustrating details of the configuration of the lithium-ion secondary battery 1 illustrated in FIG. 1. (a) of FIG. 2 illustrates a normal configuration. (b) of FIG. 2 illustrates a state in which a temperature of the lithium-ion secondary battery 1 has risen. (c) of FIG. 2 illustrates a state in which a temperature of the lithium-ion secondary battery 1 has sharply risen.

As illustrated in (a) of FIG. 2, the separator 12 has many pores P. Normally, lithium ions 3 can move back and forth in the lithium-ion secondary battery 1, through the pores P.

The temperature of the lithium-ion secondary battery 1 may rise due to, for example, excessive charging of the lithium-ion secondary battery 1 or a high current caused by short-circuiting of the external device. This causes the separator 12 to be melt or soften, so that the pores P are blocked as illustrated in (b) of FIG. 2. As a result, the separator 12 shrinks. This causes the lithium ions 3 to stop moving back-and-forth, and ultimately causes the temperature of the lithium-ion secondary battery 1 to stop rising.

Note, however, that in a case where a temperature of the lithium-ion secondary battery 1 sharply rises, the separator 12 suddenly shrinks. In this case, the separator 12 may be destroyed (see (c) of FIG. 2). This causes the lithium ions 3 to leak out from the separator 12 which has been destroyed. As a result, the lithium ions 3 will never stop moving back and forth. Consequently, the temperature continues to rise.

(Heat-Resistant Separator)

Figure 3:
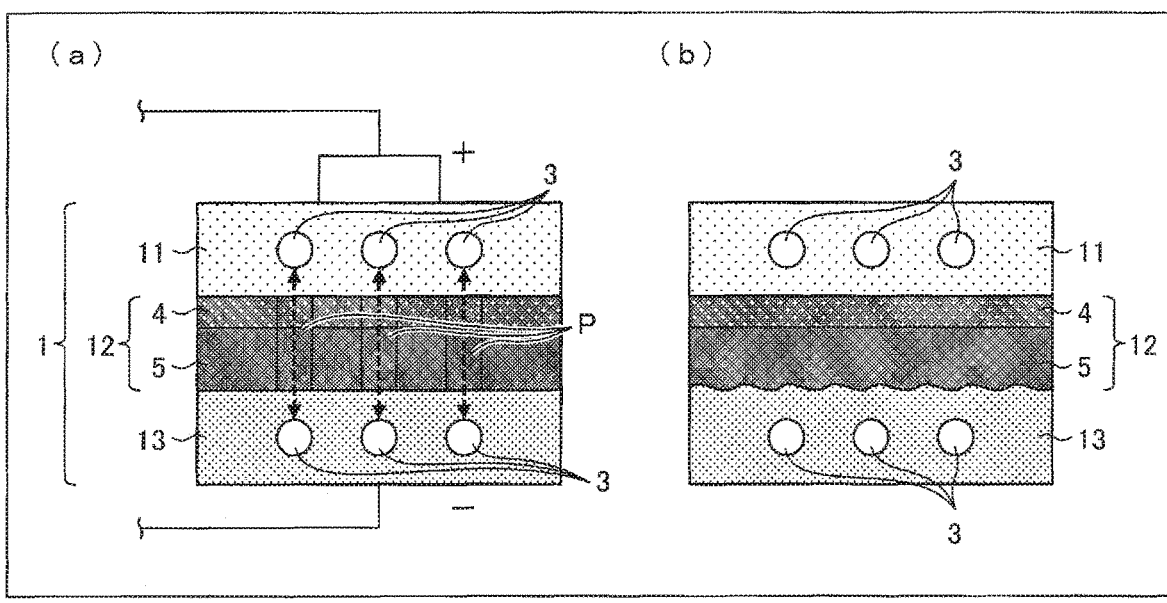
FIG. 3 is a set of views schematically illustrating another configuration of the lithium-ion secondary battery illustrated in FIG. 1.

FIG. 3 is a view schematically illustrating another configuration of the lithium-ion secondary battery 1 illustrated in FIG. 1. (a) of FIG. 3 illustrates a normal configuration, and (b) of FIG. 3 illustrates a state in which a temperature of the lithium-ion secondary battery 1 has sharply risen.

As illustrated in (a) of FIG. 3, the separator 12 can be a heat-resistant separator including a porous film 5 and a heat-resistant layer 4. The heat-resistant layer 4 is stacked on a surface of the porous film 5 which surface is on a cathode 11 side. Note that the heat-resistant layer 4 can be alternatively stacked (i) on a surface of the porous film 5 which surface is on an anode 13 side or (ii) on both surfaces of the porous film 5. Furthermore, the heat-resistant layer 4 has pores which are similar to the pores P. Normally, the lithium ions 3 move back and forth through the pores P and the pores of the heat-resistant layer 4. Materials of the heat-resistant layer 4 include wholly aromatic polyamide (aramid resin).

Even in a case where the porous film 5 melts or softens due to a sharp rise in temperature of the lithium-ion secondary battery 1, the shape of the porous film 5 is maintained (see (b) of FIG. 3) because the heat-resistant layer 4 supports the porous film 5. This causes the porous film 5 to come off with melting or softening. Therefore, the pores P only blocks up. This causes the lithium ions 3 to stop moving back and forth, and ultimately causes the above-described excessive discharging or excessive charging to stop. In this way, the separator 12 is prevented from being destroyed.

(Production Steps of Separator and Heat-Resistant Separator)

How to produce the separator and the heat-resistant separator of the lithium-ion secondary battery 1 is not specifically limited. The separator and the heat-resistant separator can be produced by a well-known method. The following discussion assumes a case where the porous film 5 contains polyethylene as a main material. Note, however, that even in a case where the porous film 5 contains another material, the separator 12 (heat-resistant separator) can be produced by employing a similar production method.

Examples of such a similar production method encompass a method which includes the steps of forming a film by adding inorganic filler or a plasticizer to a thermoplastic resin, and then removing the inorganic filler or the plasticizer by means of an appropriate solvent. For example, in a case where the porous film 5 is a polyolefin separator made of a polyethylene resin containing ultrahigh molecular weight polyethylene, it is possible to produce the porous film 5 by the following method.

This method includes (1) a kneading step of obtaining a polyethylene resin composition by kneading a ultrahigh molecular weight polyethylene with (i) an inorganic filler (such as calcium carbonate or silica) or (ii) a plasticizer (such as low molecular weight polyolefin or fluid paraffin), (2) a rolling step of forming a film by means of the polyethylene resin composition, (3) a removal step of removing the inorganic filler or the plasticizer from the film obtained in the step (2), and (4) a stretching step of obtaining the porous film 5 by stretching the film obtained in the step (3). The step (4) can be alternatively carried out between the steps (2) and (3).

In the removal step, many fine pores are formed in the film. The fine pores of the film stretched in the stretching step serve as the above-described pores P. The porous film 5 (separator 12 having no heat-resistant layer) is thus obtained. Note that the porous film 5 is a polyethylene microporous film having a prescribed thickness and a prescribed air permeability.

Note that, in the kneading step, (i) 100 parts by weight of the ultrahigh molecular weight polyethylene, (ii) 5 parts by weight to 200 parts by weight of a low-molecular weight polyolefin having a weight-average molecular weight of 10000 or less, and (iii) 100 parts by weight to 400 parts by weight of the inorganic filler can be kneaded.

Thereafter, in a coating step, the heat-resistant layer 4 is formed on the porous film 5. For example, by applying, onto the porous film 5, an aramid/NMP (N-methylpyrrolidone) solution (coating solution), the heat-resistant layer 4 that is an aramid heat-resistant layer is formed. The heat-resistant layer 4 can be formed on a single surface or both surfaces of the porous film 5. Alternatively, the heat-resistant layer 4 can be formed on the porous film 5, by applying, on the porous film 5, a mixed solution containing a filler such as alumina or carboxymethyl cellulose.

Note that, in the coating step, an adhesive layer can be formed on the porous film 5, by applying a vinylidene polyfluoride or dimethyl acetoamide solution (coating solution) on the porous film 5 (application step) and coagulating the vinylidene polyfluoride or dimethyl acetoamide solution (coagulating step). The adhesive layer can be formed on a single surface of the porous film 5 or on both surfaces of the porous film 5.

A method of coating the porous film 5 with a coating solution is not specifically limited, provided that uniform wet coating can be carried out by the method. The method can be a conventionally well-known method such as a capillary coating method, a spin coating method, a slit die coating method, a spray coating method, a dip coating method, a roll coating method, a screen printing method, a flexo printing method, a bar coater method, a gravure coater method, or a die coater method. The heat-resistant layer 4 has a thickness which can be controlled by adjusting a thickness of a coating wet film or a solid-content concentration in the coating solution.

It is possible to use a resin film, a metal belt, a drum or the like as a support with which a polyolefin base material porous film is fixed or conveyed in coating.

It is thus possible to produce the separator 12 (heat-resistant separator) in which the heat-resistant layer 4 is stacked on the porous film 5. The separator thus produced is wound around a core having a cylindrical shape. Note that a subject to be produced by the above production method is not limited to the heat-resistant separator. The above production method does not necessarily include the coating step. In a case where no coating step is included in the method, the subject to be produced is a separator having no heat-resistant layer.

A thickness, with respect to a widthwise axis, of a produced separator (original sheet film) before slitting can be measured by use of a well-known contacting or non-contacting method. A non-contacting method of measuring the thickness poses no risk of damaging a product, and is therefore preferable. A method of continuously measuring thicknesses of the separator with respect to the widthwise axis can be any of the following methods: (i) a traverse method in which a measuring device moves back and forth and (ii) a method in which inspecting devices are arranged with respect to a widthwise axis. An inclination of a thickness of a separator after slitting can be predicted based on results of the measurement of thickness of the original sheet with respect to the widthwise axis.

(Slitting Apparatus)

The heat resistant separator or the separator including no heat resistant layer (hereinafter, referred to as "separator") preferably has a width (hereinafter, referred to as "product width") suitable for application products such as the lithium-ion secondary battery 1. Note, however, that the separator is produced so as to have a width that is equal to or larger than a product width, in view of an improvement in productivity. After the separator is once produced, the separator is slit into a separator(s) having the product width.

Note that the "separator width" means a length of the separator along an axis which is (i) parallel to a plane along which the separator extends and (ii) perpendicular to a lengthwise axis of the separator. Hereinafter, a wide separator, which has not subjected to slitting, is referred to as an "original sheet," whereas particularly a separator which has been subjected to slitting is referred to as a "slit separator." Note also that (i) "slitting" means to slit the separator in a lengthwise direction (flow direction of the film during production; MD: Machine direction) and (ii) "cutting" means to slit the separator in a transverse direction (TD). Note that the transverse direction (TD) means a direction which is (i) parallel to the plane along which the separator extends and (ii) substantially perpendicular to the lengthwise direction (MD) of the separator.

Figure 4:
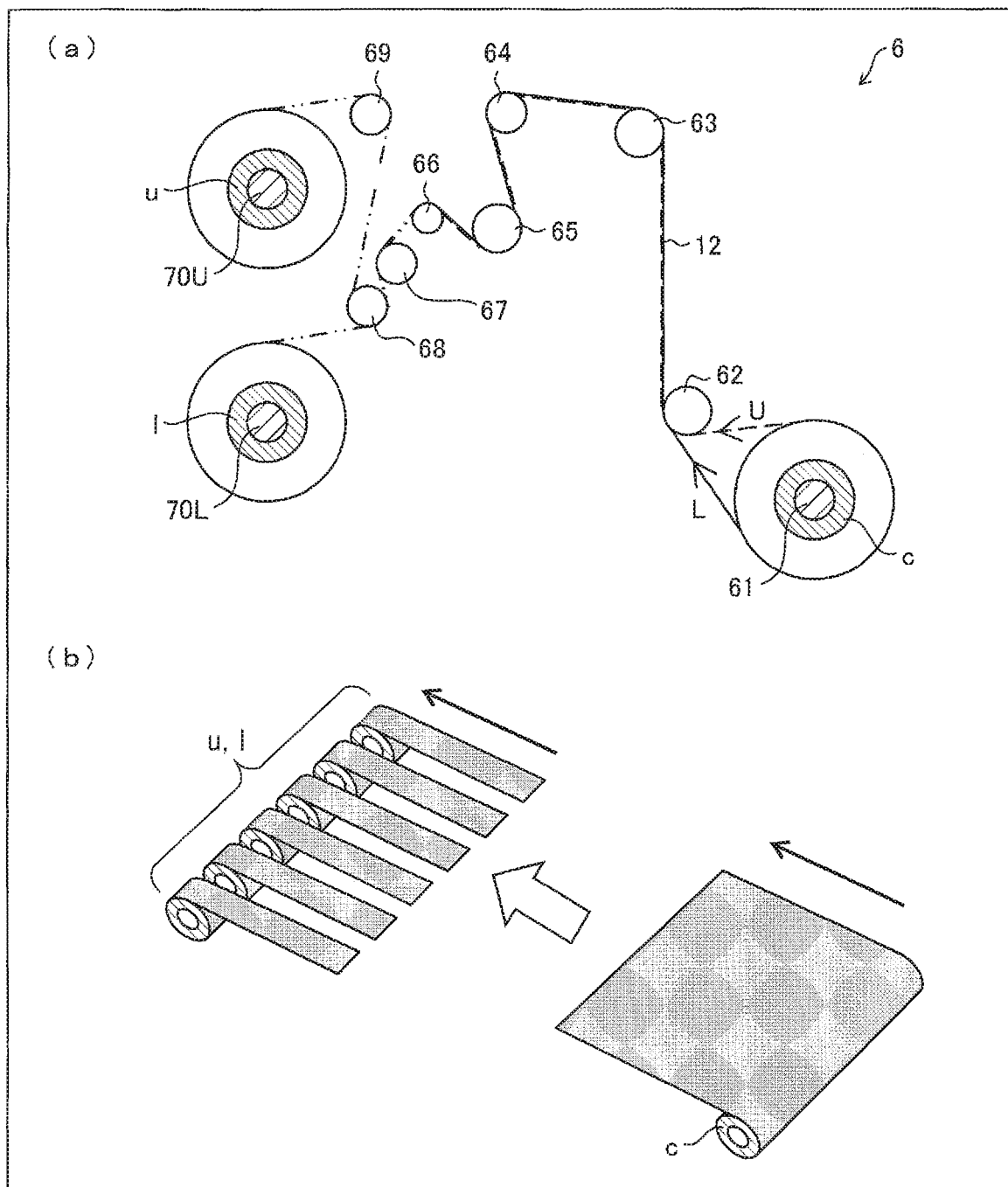
FIG. 4 is a set of views schematically illustrating a configuration of a slitting apparatus for slitting a separator.

FIG. 4 is a view schematically illustrating a configuration of a slitting apparatus 6 for slitting the separator. (a) of FIG. 4 illustrates an entire configuration, and (b) of FIG. 4 illustrates arrangements before and after slitting the original sheet.

As illustrated in (a) of FIG. 4, the slitting apparatus 6 includes a rotatably-supported cylindrical wind-off roller 61, rollers 62 through 69, and take-up rollers 70U and 70L. The slitting apparatus 6 further includes cutting devices 7 described later.

(Before Slitting)

In the slitting apparatus 6, a cylindrical core c around which the original sheet is wrapped is fit on the wind-off roller 61. As illustrated in (b) of FIG. 4, the original sheet is wound off from the core c to a route U or L. The original sheet which has been thus wound off is conveyed to the roller 68, via the rollers 63 through 67. In the conveying step, the original sheet is slit into a plurality of slit separators. Alternatively, it is also possible to change the numbers and arrangements of the rollers 62 through 69 in order to convey the original sheet in a desired pathway.

(After Spitting)

As illustrated in (b) of FIG. 4, some of the slit separators are wound around respective cylindrical cores u (bobbins), which are fit on the take-up roller 70U. Meanwhile, the others of the plurality of slit separators are wound around respective cylindrical cores l (bobbins), which are fit on the take-up roller 70L. Note that (i) the slit separators each wound around in a roll manner and (ii) the respective cores u and l are, as a whole, referred to as a "roll".

(Cutting Device)

Figure 5:
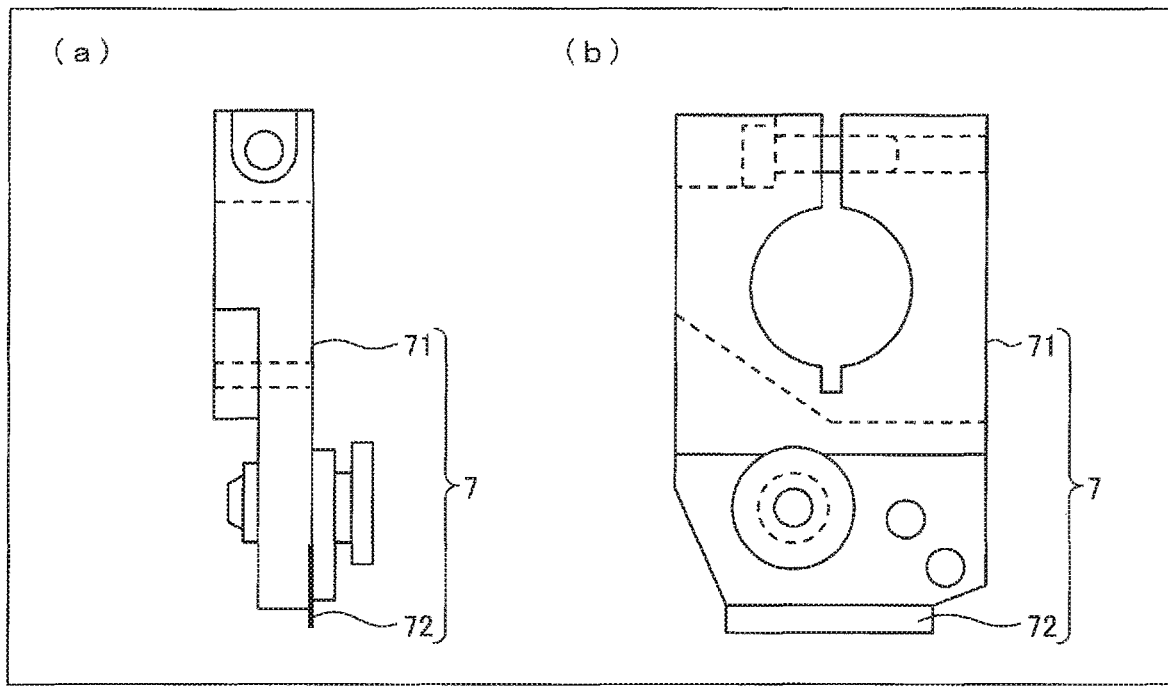
FIG. 5 is a combination of a side view and a front view illustrating a configuration of a cutting device of the slitting apparatus illustrated in FIG. 4.

FIG. 5 is a view illustrating a configuration of each of the cutting devices 7 in the slitting apparatus 6 as illustrated in (a) of FIG. 4. (a) of FIG. 5 is a side view of the cutting device 7, and (b) of FIG. 5 is a front view of the cutting device 7.

As illustrated in (a) and (b) of FIG. 5, each of the cutting devices 7 includes a holder 71 and a blade 72. The holder 71 is fixed to a housing or the like provided in the slitting apparatus 6. The holder 71 holds the blade 72 such that the blade 72 and original sheet of the separator being conveyed have a fixed positional relation. The blade 72 (i) has a finely sharpened edge and (ii) slits the original sheet of the separator by using the edge.

Embodiment 1

The following description will discuss Embodiment 1 of the present invention with reference to FIGS. 6 through 9.

<<Configuration of Roll>>

A roll is obtained by winding, around a core, a slit separator (film) which was obtained by cutting an original sheet in a lengthwise direction. A surface of a roll 10 (described later; see FIG. 8) according to Embodiment 1 can restrict an inclination, with respect to a widthwise axis, of an outer circumferential surface t of a slit separator 9 (film) by winding the slit separator 9 around a core 8 while deformation of the core 8 and a thickness of the slit separator 9 are taken into consideration. Configurations of the components of the roll 10 will be described below in order.

(Core)

Figure 6:
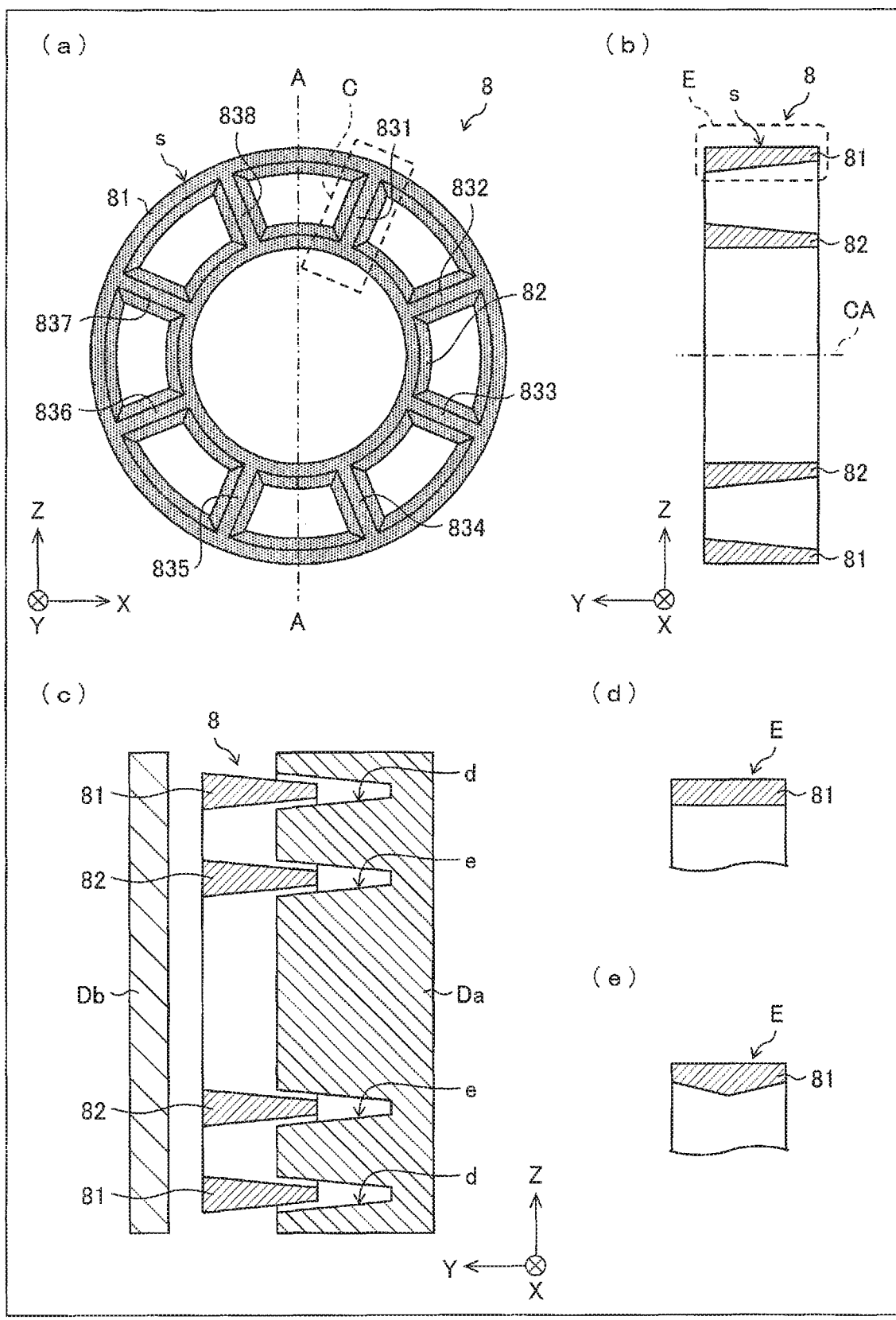
FIG. 6 is a combination of a front view and a cross-sectional view illustrating a configuration of a core of a roll according to Embodiment 1.

FIG. 6 is a set of views illustrating a configuration of the core 8 of the roll 10 according to Embodiment 1. (a) of FIG. 6 is a front view. (b) of FIG. 6 is a cross-sectional view taken along the line A-A illustrated in (a) of FIG. 6. (c) of FIG. 6 is a cross-sectional view which illustrates a method of producing the core 8 and which corresponds to (b) of FIG. 6. (d) and (e) of FIG. 6 are each a cross-sectional view illustrating another configuration of a region E illustrated in (b) of FIG. 6. Note that X, Y, and Z axes shown in (a) of FIG. 6 correspond to X, Y, and Z axes, respectively, which are shown in each of the views other than (a) of FIG. 6.

As illustrated in (a) of FIG. 6, the core 8 includes an outer cylinder part 81 (cylindrical member), an inner cylinder part 82, and ribs 831 through 838.

The outer cylinder part 81 is a cylindrical member having rigidity and elasticity which are suitable for a slit separator to be wound around an outer circumferential surface s of the outer cylinder part 81. The inner cylinder part 82 is a cylindrical member having an inner circumferential surface to which a take-up roller is to be fitted. The ribs 831 through 838 (support member) extend between the inner circumferential surface of the outer cylinder part 81 and the outer circumferential surface of the inner cylinder part 82, and are provided at intervals so as to support the outer cylinder part 81 from the inside.

As illustrated in (b) of FIG. 6, a thickness (material thickness) of a negative side (one end side) of the y-axis of the outer cylinder part 81 is smaller than a thickness of a positive side (the other end side) of the y-axis.

A center axis CA of the outer cylinder part 81 extends along the y-axis. There is a match between the center axis CA of the outer cylinder part 81 and a center axis of the inner cylinder part 82.

(Core Molding Method)

As illustrated in (c) of FIG. 6, the core 8 is produced by resin molding in which molds Da and Db are used. A surface of the mold Da, which surface faces the mold Db, has groove parts d and e which correspond to the outer cylinder part 81, the inner cylinder part 82, and the ribs 831 through 838. According to this resin molding, the outer cylinder part 81 and the inner cylinder part 82 are each made of a resin containing any one of the following: ABS resin, polyethylene resin, polypropylene resin, polystyrene resin, polyester resin, and vinyl chloride resin.

The groove parts d and e are each shaped so that a deeper part is narrower. This makes it possible that the thickness of the outer cylinder part 81 of the core 8 to be molded is (i) smaller toward the negative side of the y-axis (corresponding to the mold Da) and (ii) larger toward the positive side of the y-axis (corresponding to the mold Db). In other words, a distribution of the thickness (hereinafter referred to as "thickness distribution") of the outer cylinder part 81 can be monotonically inclined with respect to the y-axis. In so doing, (i) part of the outer cylinder part 81, which part has a large thickness, can have high rigidity and (ii) part of the outer cylinder part 81, which part has a small thickness, can have relatively low rigidity.

The outer circumferential surface s after the outer cylinder part 81 has been removed from the groove part d is processed so as to be parallel to the center axis CA. This also applies to the inner circumferential surface after the inner cylinder part 82 has been removed from the groove part e.

As illustrated in (d) of FIG. 6, the thickness distribution of the outer cylinder part 81 may not be inclined with respect to the y-axis. In addition, as illustrated in (e) of FIG. 6, the thickness distribution of the outer cylinder part 81 may not be monotonically inclined with respect to the y-axis.

(Outer Diameter of Core)

Figure 7:
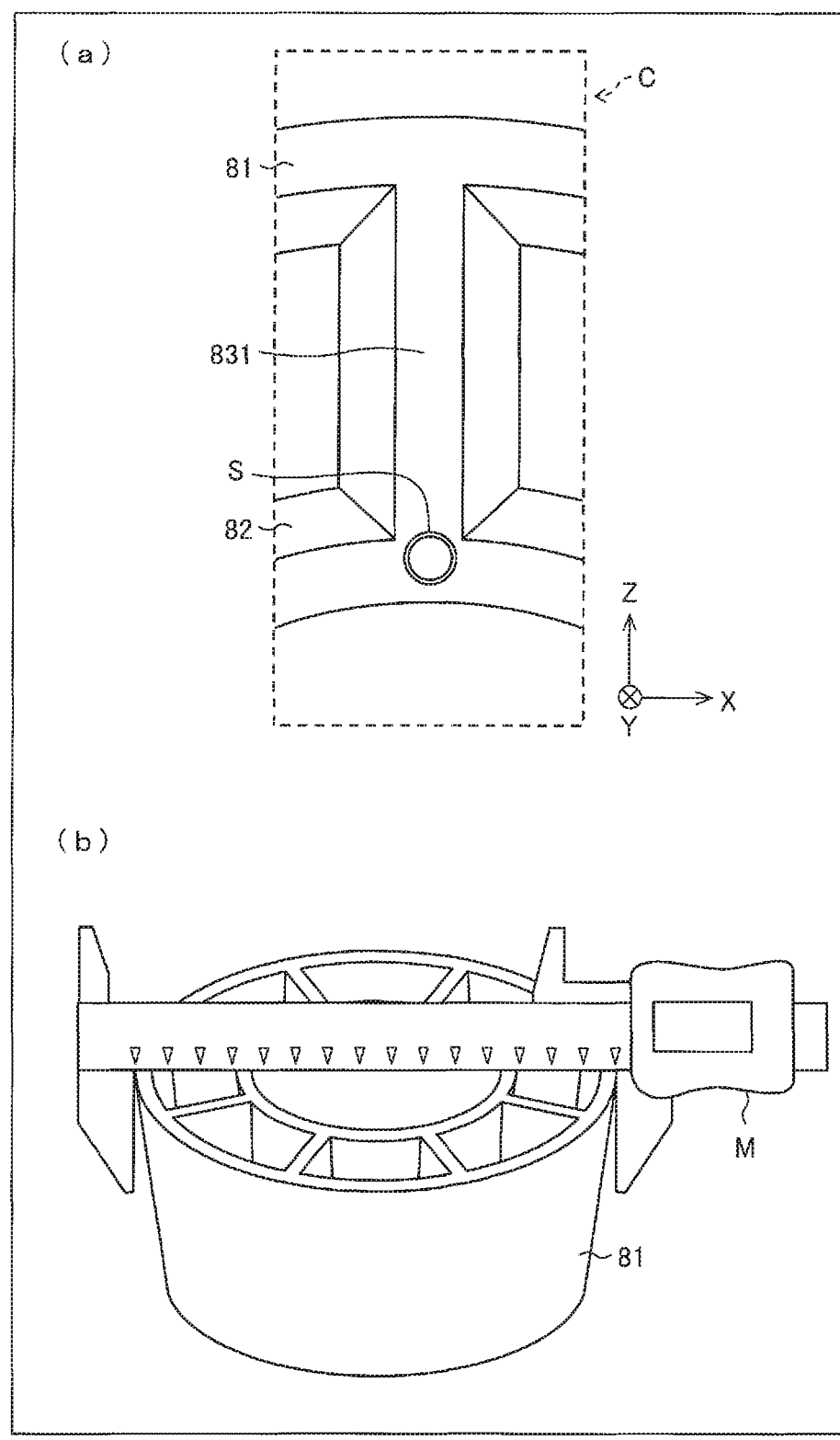
FIG. 7 is a combination of a front view and a schematic view for describing a method of measuring an outer diameter of the core illustrated in FIG. 6.

FIG. 7 is a set of views for describing a method of measuring an outer diameter of the core 8 illustrated in (a) of FIG. 6. (a) of FIG. 7 is a front view illustrating a region C shown in (a) of FIG. 6, and (b) of FIG. 7 is a view schematically illustrating how the outer diameter is measured.

As illustrated in (a) of FIG. 7, a mark S is given to one surface of the outer cylinder part 81. The mark S is an imprint of a jig used in combination with a mold in a case where the core 8 is molded with the use of the mold. Examples of the jig encompass a guide pin for positioning the mold. The mark S is thus given to the one surface of the outer cylinder part 81. The mark S can be a sign for identifying a core of a production lot or the like. In a case where there is only a slight difference in thickness between parts of the outer cylinder part 81, it is difficult to identify a part having a larger thickness. However, the part having a larger thickness can be identified by identifying which of the parts has the mark S.

In the following description, a surface of the outer cylinder part 81, which surface faces toward the positive side of the y-axis, will be hereinafter referred to as "reference surface." The other surface of the outer cylinder part 81, which surface faces toward the negative side of the y-axis, will be hereinafter referred to as "back surface."

As illustrated in (b) of FIG. 7, the diameter of the outer cylinder part 81 (hereinafter referred to as "outer diameter") is measured by causing a slide caliper M, for example, to come into contact with the outer cylinder part 81 from one-surface side.

Table 1 shows outer diameters of the core 8, which are measured by carrying out the measuring method described above. As shown in Table 1, outer diameters of three samples 1 through 3 of the core 8 were measured. Note that the samples 1 through 3 are the same as those shown in each of Tables 2 through 4 described later. Note also that outer diameters of a reference surface and a back surface of each of the samples were measured. Each of values in the "difference" columns indicates a value obtained by subtracting the outer diameter of the back surface from the outer diameter of the reference surface (this value will be hereinafter referred to as "outer diameter difference"). The outer diameters were measured at eight points of each surface.

In Table 1, (i) the row indicated by "831" which is in the "measured point" column deals with values each concerning an outer diameter at a position of the rib 831 shown in (a) of FIG. 6 and (ii) the row indicated by "831*a*" which is in the "measure point" column deals with values each concerning an outer diameter at a position which is at a distance equally from the rib 831 and the rib 832. This also applies to the rows indicated by the other numbers in the "measured point" column. Average values of the outer diameter differences at the respective eight measured points are approximately −0.02 mm or more and −0.01 mm or less.

These outer diameter differences each fall in a range of −0.04 mm or more to 0.03 mm or less. That is, an absolute value of each of the outer diameter differences is 0.04 mm or less. In a case where a slit separator is, for example, 16 μm in thickness, an absolute value of an outer diameter difference is less than as much a value as a total thickness of three pieces of this slit separator combined. Since a slit separator is wound around the core 8 hundreds of times to tens of thousands of times, an outer diameter difference of as much a value as a total thickness of approximately three pieces of the slit separator combined can be regarded as non-existent.

(Core Thickness)

As is the case of the measuring method described above, a thickness of the outer cylinder part 81 (hereinafter referred to as "material thickness") is measured by, for example, causing a slide caliper M to come into contact with the outer cylinder part 81 from a one-surface side of the core 8 so as to sandwich the outer cylinder part 81 along a thicknesswise axis.

TABLE 1

| | Unit: mm | | | | | | | | |
|---|---|---|---|---|---|---|---|---|---|
| Measured | Sample 1 | | | Sample 2 | | | Sample 3 | | |
| Point | RS | BS | Difference | RS | BS | Difference | RS | BS | Difference |
| 831 | 152.55 | 152.56 | −0.01 | 152.50 | 152.54 | −0.04 | 152.55 | 152.56 | −0.01 |
| 831a | 152.52 | 152.54 | −0.02 | 152.46 | 152.48 | −0.02 | 152.54 | 152.55 | −0.01 |
| 832 | 152.54 | 152.58 | −0.04 | 152.42 | 152.45 | −0.03 | 152.51 | 152.50 | 0.01 |
| 832a | 152.52 | 152.55 | −0.03 | 152.49 | 152.49 | 0.00 | 152.48 | 152.49 | −0.01 |
| 833 | 152.52 | 152.50 | 0.02 | 152.50 | 152.53 | −0.03 | 152.41 | 152.45 | −0.04 |
| 833a | 152.52 | 152.49 | 0.03 | 152.53 | 152.56 | −0.03 | 152.43 | 152.47 | −0.04 |
| 834 | 152.42 | 152.43 | −0.01 | 152.56 | 152.53 | 0.03 | 152.48 | 152.49 | −0.01 |
| 834a | 152.46 | 152.47 | −0.01 | 152.56 | 152.58 | −0.02 | 152.53 | 152.55 | −0.02 |
| AV | 152.51 | 152.52 | −0.01 | 152.50 | 152.52 | −0.02 | 152.49 | 152.51 | −0.02 |
| Max. V | | | 0.03 | | | 0.03 | | | 0.01 |
| Min. V | | | −0.04 | | | −0.04 | | | −0.04 |

Abbreviations:
RS: Reference Surface
BS: Back Surface
AV: Average Value
Max. V: Maximum Value
Min. V: Minimum Value

TABLE 2

| | | | | Unit: mm | | | | | |
|---|---|---|---|---|---|---|---|---|---|
| Measured | Sample 1 | | | Sample 2 | | | Sample 3 | | |
| Point | RS | BS | Difference | RS | BS | Difference | RS | BS | Difference |
| 831a | 6.18 | 6.11 | 0.07 | 6.39 | 6.15 | 0.24 | 6.13 | 6.05 | 0.08 |
| 832a | 5.94 | 5.87 | 0.07 | 6.25 | 6.12 | 0.13 | 6.12 | 6.07 | 0.05 |
| 833a | 6.08 | 6.00 | 0.08 | 6.12 | 6.10 | 0.02 | 6.17 | 6.06 | 0.11 |
| 834a | 6.23 | 6.01 | 0.22 | 6.26 | 6.12 | 0.14 | 6.22 | 6.01 | 0.21 |
| 835a | 6.28 | 6.21 | 0.07 | 6.15 | 6.03 | 0.12 | 6.19 | 5.94 | 0.25 |
| 836a | 6.19 | 6.07 | 0.12 | 6.33 | 6.05 | 0.28 | 5.94 | 5.86 | 0.08 |
| 837a | 6.26 | 6.12 | 0.14 | 6.29 | 5.99 | 0.30 | 6.18 | 5.84 | 0.34 |
| 838a | 6.22 | 6.02 | 0.20 | 6.41 | 6.18 | 0.23 | 6.14 | 6.08 | 0.06 |
| AV | 6.17 | 6.05 | 0.12 | 6.28 | 6.09 | 0.18 | 6.14 | 5.99 | 0.15 |
| Max. V | | | 0.22 | | | 0.30 | | | 0.34 |
| Min. V | | | 0.07 | | | 0.02 | | | 0.05 |

Abbreviations:
RS: Reference Surface
BS: Back Surface
AV: Average Value
Max. V: Maximum Value
Min. V: Minimum Value Table 2 shows material thicknesses measured by carrying out a measuring method similar to that illustrated in (b) of FIG. 7. As shown in Table 2, material thicknesses of three samples 1 through 3 of the core 8 were measured. The material thicknesses of a reference surface and a back surface of each of the samples were measured. The "difference" columns deal with values, each of which is obtained by subtracting the material thickness of the back surface from the material thickness of the reference surface (this value will be hereinafter referred to as "material thickness difference"). The material thicknesses were measured at eight points of each surface.

In Table 2, the row indicated by "831a" which is in the "measure point" column deals with values each concerning a material thickness at a position which is at a distance equally from the rib 831 and the rib 832 shown in (a) of FIG. 6. This applies to the rows indicated by the other numbers in the "measured point" column. Note that the row indicated by "838a" deals with values each concerning a material thickness at a position which is at a distance equally from the rib 838 and the rib 831.

Average values of the material thickness differences at the respective eight measured points are approximately 0.12 mm or more and 0.18 mm or less. That is, the material thickness of the reference surface is larger than the material thickness of the back surface. The material thickness differences are more significant than the above described outer diameter differences. The material thickness differences each fall within a range of 0.02 mm or more to 0.34 mm or less.

(Outer Diameter of Roll)

The slit separator 9 is to be wound around the core 8 hundreds of times to tens of thousands of times, for example. If the slit separator 9 has a uniform thickness of 16 μm, then the outer diameter of the roll 10 increases by 32 μm each time the slit separator 9 is wound around the core 8 once. This causes the outer diameter to constantly increase by approximately 3.2 mm to 320 mm from the beginning to the end of the process of winding the slit separator 9 around the core 8.

However, the thickness of the slit separator 9 is inclined with respect to the widthwise axis. Therefore, an actual outer diameter of the roll does not constantly increase.

Figure 8:
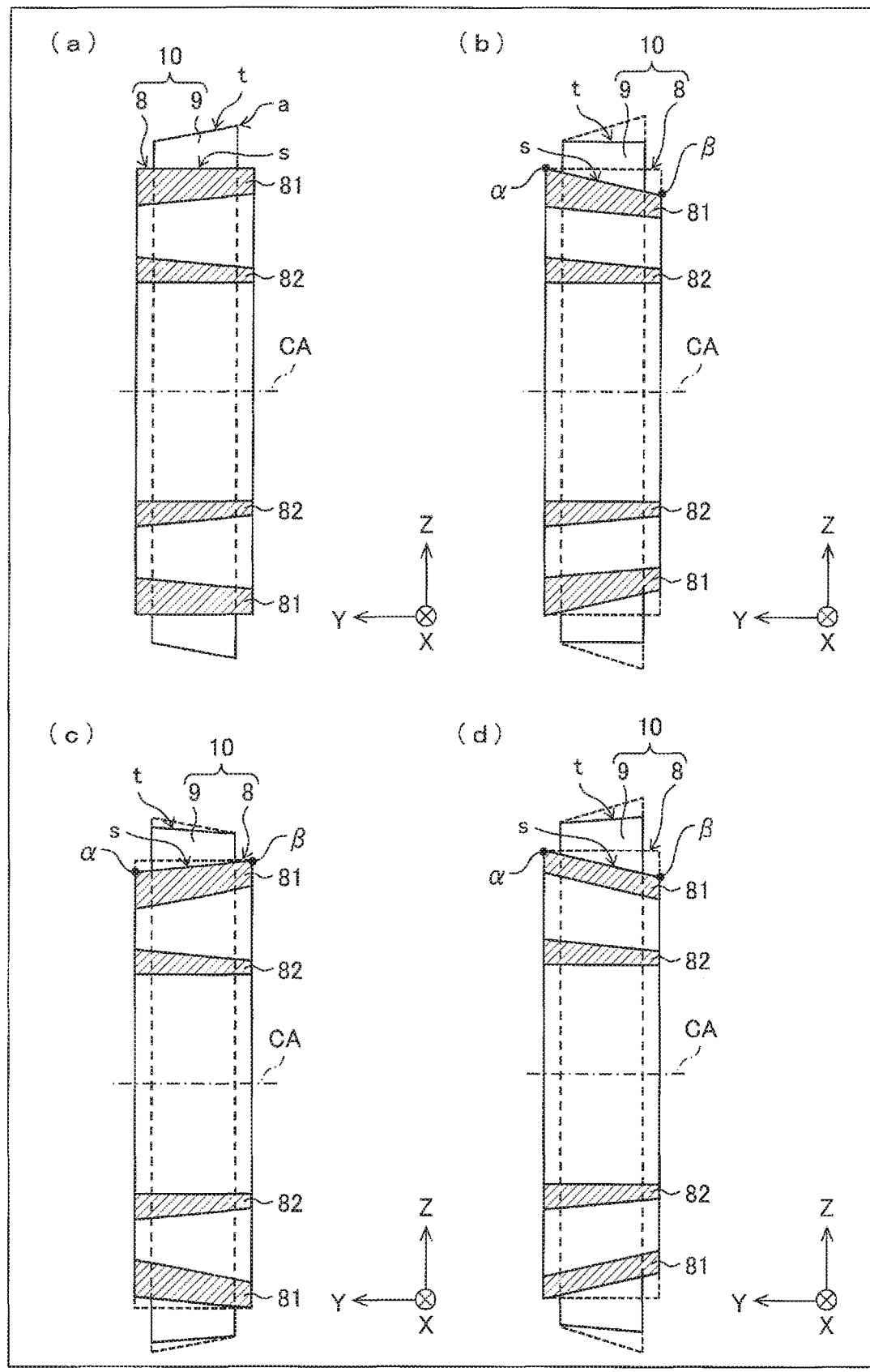
FIG. 8 is a set of cross-sectional views illustrating configurations of rolls in which respective slit separators are each wound around the core illustrated in FIG. 6.

FIG. 8 is a set of cross-sectional views illustrating configurations of rolls 10 in which respective slit separators 9 are each wound around the core 8 illustrated in (b) of FIG. 6. (a) of FIG. 8 illustrates the configuration in a case where the outer cylinder part 81 is not elastically deformed. (b) of FIG. 8 illustrates the configuration in a case where the outer cylinder part 81 is elastically deformed. (c) of FIG. 8 illustrates the configuration of a roll 10 of Reference Example 1 in which a slit separator 9 is oriented opposite the slit separator 9 shown in (b) of FIG. 8 with respect to the y-axis. (d) of FIG. 8 illustrates a configuration of a roll 10 of Reference Example 2 in which an outer cylinder part 81 differs from the outer cylinder part 81 shown in (b) of FIG. 8 in that a thickness distribution of the outer cylinder part 81 of Reference Example 2 is not inclined.

If the outer cylinder part 81 is not elastically deformed (see (a) of FIG. 8), then the surface of the roll 10 is not inclined, but has a part a which is rising and located toward the negative side of the y-axis.

Part of a thickness distribution of the original sheet is reflected in a thickness distribution of the slit separator 9. In the part, the thickness distribution of the original sheet tends to change monotonically. In so doing, the thickness of the slit separator 9 becomes large toward one of widthwise ends. In a case where the slit separator 9 is wound around the core 8 over and over, thick parts of the slit separator 9 become layered. This causes one end (e.g. part a) of the roll 10 to rise.

The fact that one part, such as the part a, of the slit separator 9 is rising means that the part a is more stretched than the other part of the slit separator 9. Since the slit separator 9 has plasticity, remaining in a stretched state for an extended period of time causes the slit separator 9 to be subjected to a plastic deformation into a stretched shape. This causes the slit separator 9, after the slit separator 9 has been removed from the core 8, to be bent by a large amount as illustrated in (c) of FIG. 9 even though the original sheet was slit linearly.

Note that "widthwise axis" refers to an axis substantially perpendicular to the lengthwise axis and the thicknesswise axis of the slit separator 9. The "widthwise axis" is parallel to the y-axis.

(Deformation of Outer Cylinder Part)

As illustrated in (b) of FIG. 8, the outer cylinder part 81, around which the slit separator 9 is wound, is actually deformed toward the inside due to elasticity. In so doing, a part β of the outer cylinder part 81, which part β is small in thickness, is elastically deformed toward the inside by a larger amount than a part α of the outer cylinder part 81, which part α is large in thickness. The part of the slit separator 9, which part is large in thickness, is wound toward the part β which is thus bent toward the inside by a large amount. Therefore, rising of the slit separator 9, which may occur in a case where the outer cylinder part 81 is not subjected to the elastic deformation, and the elastic deformation of the outer cylinder part 81 offset each other. Therefore, in the case illustrated in (b) of FIG. 8, the inclination of the outer circumferential surface t of the slit separator 9 is more restricted than is the case illustrated in (a) of FIG. 8. This principle of restriction of inclination can be explained as follows.

In a case where the slit separator 9 is wound around the outer cylinder part 81, a thick part of the slit separator 9, which thick part is large in thickness, rises by a relatively large amount as is the case of the part a shown in (a) of FIG. 8. The thick part is therefore more stretched by a take-up tensile force than the other part. This subjects the slit separator 9 to a force by which the slit separator 9 tends toward the shape before being stretched. This subjects a part of the outer cylinder part 81, which part corresponds to the thick part of the slit separator 9, to a force which constricts the outer cylinder part 81 toward the inside. Then, an elastic deformation of the core 8 cancels out an amount of deformation by which the slit separator 9 would be stretched. This makes it unlikely for the slit separator 9 to be subjected to a plastic deformation.

Note that the elastic deformation is, in other words, a phenomenon where a force, which is applied to the cylindrically-shaped outer circumferential surface s of the outer cylinder part 81 of the core 8 so as to shorten a circumference of the outer circumferential surface s, causes a circumference of one end part to be shorter than a circumference of the other end part.

The core 8 is to be repeatedly used over and over for winding of slit separators 9. A new core 8 immediately after production and an old core 8, which has been repeatedly used, can differ in terms of deforming amount of an outer cylinder part 81. However, in a case where the cores 8 are used within a range in which the outer cylinder part 81 is elastically deformed, the difference in the deforming amount can be regarded as small.

In addition, measurements of the outer diameters and material thicknesses of the outer cylinder part 81 vary between the reference surface and the back surface. Furthermore, even on the same surface (one of the reference surface and the back surface) of the outer cylinder part 81, measurements of the outer diameters and material thicknesses vary between measured points. This is presumably because of a method of fixing the outer cylinder part 81 and/or a method of processing the outer cylinder part 81 during production of the core 8. However, since the slit separator 9 is wound around the entire circumferential surface of the outer cylinder part 81, an average value of the plurality of measurements of the outer diameters and material thicknesses at differing positions on the same surface can be regarded as reflecting the shape of the core 8 shown in (b) of FIG. 8.

Reference Example 1

According to the configuration shown in (c) of FIG. 8, the slit separator 9 is oriented opposite the slit separator 9 shown in (b) of FIG. 8 with respect to the y-axis. The thick part of the slit separator 9, which thick part is large in thickness, is wound toward a part a of the outer cylinder part 81, which part α is large in thickness. As described above, A part of the outer cylinder part 81, which part corresponds to the thick part of the slit separator 9, is subjected to a force which constricts the outer cylinder part 81 toward the inside. However, the part α-side of the outer cylinder part 81, which side is large in thickness, is smaller in elastic deformation than a part β-side which is small in thickness. This forcefully subjects the slit separator 9 to a plastic deformation. That is, the core 8 is not elastically deformed, and therefore an amount of deformation, by which the slit separator 9 would be stretched, is not cancelled out. This subjects the slit separator 9 to a plastic deformation, and therefore causes the slit separator 9, after the slit separator 9 has been wound off from the core 8, to be bent as illustrated in (b) of FIG. 9.

The thick part of the slit separator 9, which thick part is large in thickness, is wound more firmly than a part which is small in thickness. This causes a deforming amount of the part α of the outer cylinder part 81 to be larger than that of the part β, and therefore restricts an inclination of an outer circumferential surface t of the slit separator 9. The degree to which the inclination is restricted is smaller than is the case illustrated in (b) of FIG. 8.

Reference Example 2

As opposed to the thickness distribution of the outer cylinder part 81 shown in (b) of FIG. 8, a thickness distribution of the outer cylinder part 81 is not inclined according to the configuration shown in (d) of FIG. 8. The outer cylinder part 81 has a uniform thickness from a part α-side to a part β-side. This causes the outer cylinder part 81 to have uniform rigidity from the part α-side to the part β-side.

In this case also, a thick part of the slit separator 9, which thick part is large in thickness, is wound more firmly than a part which is small in thickness. This causes a deforming amount of the part β of the outer cylinder part 81 to be larger than that of the part α, and therefore restricts an inclination of an outer circumferential surface t of the slit separator 9. The degree to which the inclination is restricted can vary, depending on a strength of the outer cylinder part 81. The strength of the outer cylinder part 81 can vary, depending on the thickness of the outer cylinder part 81 and/or a material of which the outer cylinder part 81 is made.

(Outer Diameter of Deformed Core)

TABLE 3

| | Unit: mm | | | | | | | | |
|---|---|---|---|---|---|---|---|---|---|
| Measured | Sample 1 | | | Sample 2 | | | Sample 3 | | |
| Point | RS | BS | Difference | RS | BS | Difference | RS | BS | Difference |
| 831a | 152.12 | 152.07 | 0.05 | 152.28 | 152.24 | 0.04 | 152.04 | 152.02 | 0.02 |
| 832a | 151.95 | 151.89 | 0.06 | 152.01 | 151.90 | 0.11 | 151.76 | 151.82 | −0.06 |

TABLE 3-continued

| | Unit: mm | | | | | | | | |
|---|---|---|---|---|---|---|---|---|---|
| | Sample 1 | | | Sample 2 | | | Sample 3 | | |
| Measured Point | RS | BS | Difference | RS | BS | Difference | RS | BS | Difference |
| 833a | 152.07 | 151.98 | 0.09 | 152.20 | 152.22 | −0.02 | 152.03 | 152.00 | 0.03 |
| 834a | 151.91 | 151.79 | 0.12 | 151.99 | 151.94 | 0.05 | 151.71 | 151.79 | −0.08 |
| 835a | 152.06 | 152.04 | 0.02 | 152.19 | 152.19 | 0.00 | 152.00 | 151.99 | 0.01 |
| 836a | 151.94 | 151.82 | 0.12 | 152.06 | 151.88 | 0.18 | 151.73 | 151.76 | −0.03 |
| 837a | 152.05 | 152.01 | 0.04 | 152.24 | 152.24 | 0.00 | 151.93 | 151.99 | −0.06 |
| 838a | 151.96 | 151.80 | 0.16 | 152.09 | 151.98 | 0.11 | 151.76 | 151.78 | −0.02 |
| AV | 152.01 | 151.93 | 0.08 | 152.13 | 152.07 | 0.06 | 151.87 | 151.89 | −0.02 |
| Max. V | | | 0.16 | | | 0.18 | | | 0.03 |
| Min. V | | | 0.02 | | | −0.02 | | | −0.08 |

Abbreviations:
RS: Reference Surface
BS: Back Surface
AV: Average Value
Max. V: Maximum Value
Min. V: Minimum Value Table 3 shows outer diameters of cores 8, each of which outer diameters was measured after a slit separator 9 was wound and then deformed. As shown in Table 3, outer diameters of three samples 1 through 3 of the core 8 were measured. The columns, rows, and numerical values of Table 3 respectively correspond to those of Table 1. Note that the samples 1 and 2 each correspond to the core 8 of the roll 10 illustrates in (b) of FIG. 8. The sample 3 corresponds to the core 8 of the roll 10 illustrated in (c) of FIG. 8.

As shown in Table 3, an average value of the outer diameter differences of the sample 1 is 0.08 mm. This means that the outer diameters of the reference surface are larger than those of the back surface on average. An average value of the outer diameter differences of the sample 1 shown in Table 1 is −0.01 mm. This means that the outer diameters of the reference surface are smaller than those of the back surface on average.

Before and after deformation of the core 8, a relationship between the reference surface and the back surface is thus reversed in terms of which has larger outer diameters. In addition, before and after deformation of the sample 2 of the core 8, as is the case of the sample 1, a relationship between the reference surface and the back surface is reversed in terms of which has larger outer diameters. Meanwhile, before and after deformation of the sample 3 of the core 8, a relationship between the reference surface and the back surface is not reversed in terms of which has larger outer diameters.

(Circumference of Core)

TABLE 4

| | Unit: mm | | | | | | | | |
|---|---|---|---|---|---|---|---|---|---|
| | Sample 1 | | | Sample 2 | | | Sample 3 | | |
| | RS | BS | Difference | RS | BS | Difference | RS | BS | Difference |
| AT | 0.0198 | 0.0208 | −0.0010 | 0.0182 | 0.0188 | −0.0006 | 0.0191 | 0.0183 | 0.0008 |
| Core Cir. (before winding) | 479.11 | 479.14 | −0.02 | 479.09 | 479.13 | −0.04 | 479.05 | 479.10 | −0.05 |
| AMT | 6.17 | 6.05 | 0.12 | 6.28 | 6.09 | 0.18 | 6.14 | 6.99 | 0.15 |
| Core Cir. (after winding) | 477.73 | 477.51 | 0.22 | 478.07 | 477.91 | 0.15 | 477.36 | 477.43 | −0.07 |
| Roll Diameter | 214.37 | 214.42 | −0.05 | 213.40 | 213.58 | −0.18 | 211.91 | 211.54 | 0.37 |
| Accu. T | 31.18 | 31.25 | −0.07 | 30.63 | 30.75 | −0.12 | 30.02 | 29.82 | 0.20 |
| CCA | 1.38 | 1.62 | −0.24 | 1.02 | 1.22 | −0.20 | 1.70 | 1.67 | 0.03 |

Abbreviations:
AT: Average Thickness
Core Cir.: Core circumference
AMT: Average Material Thickness
Accu. T: Accumulative Thickness
CCA: Circumference Changing Amount Table 4 shows circumferences and the like of the cores 8 which were measured before and after the slit separators 9 were wound. As shown in Table 4, circumferences and the like of three samples 1 through 3 of the core 8 were measured. The circumferences and the like of a reference surface and a back surface of each of the samples were measured.

The "average thickness" row deals with average thicknesses of the slit separators 9. The "core circumference (before winding)" row deals with the circumferences of the cores 8 before the corresponding slit separators 9 are wound (circumferences of the outer cylinder parts 81). The "average material thickness" row deals with average material thicknesses of outer cylinder parts 81 of the cores 8. The "core circumference (after winding)" row deals with the circumferences of the cores 8 after the corresponding slit separators 9 are wound (circumferences of the outer cylinder parts 81). The "roll diameter" row deals with diameters of the rolls 10 after the respective slit separators 9 are wound around the corresponding cores 8. The "accumulated thickness" row deals with lengths, each of which is measured between (i) an outer circumferential surface s of an outer cylinder part 81 after a slit separator 9 is wound around a core 8 and (ii) a corresponding outer circumferential surface t of the slit separator 9. That is, the each of the lengths is a total thickness obtained by accumulating the thickness of the slit separator 9 as many times as the slit separator 9 is wound. Note that each of the values in the "average thickness" row was measured with the use of a "high-resolution digital measuring device LITEMATIC 50A (manufactured by Mitutoyo Corporation)." The "circumference changing amount" row deals with values each obtained by subtracting a circumference of the core 8, around which the slit separator 9 has been wound, from a circumference of the core 8 around which the slit separator 9 is yet to be wound.

As shown in Table 4, (i) the value of the back surface of the sample 1 is larger than the value of the reference surface of the same in the "average thickness" row and (ii) the value of the back surface of the sample 1 is smaller than the value of the reference surface of the same in the "core circumference (after winding)" row. This also applies to the sample 2. The value of the reference surface of the sample 3 is larger than the value of the back surface of the same in the "average thickness" row. The value of the reference surface of the sample 3 is smaller than the value of the back surface of the same in the "core circumference (after winding)" row. By use of these values in the "average thickness" row and the "core circumference (after winding)" row, it is possible to specify the rolls 10 illustrated in (b) and (c) of FIG. 8.

Specifically, it is possible to specify a roll 10 as a film roll which (i) includes a core 8 and a slit separator 9, the core 8 including an outer cylinder part 81 that has an outer circumferential surface s around which the slit separator 9 is to be wound, and the slit separator 9 having been wound around the outer circumferential surface s and having a thickness that is larger toward one end part of the slit separator 9 than it is toward the other end part and (ii) is configured so that a circumference of one end part of the outer circumferential surface s is shorter than a circumference of the other end part of the outer circumferential surface s. By thus specifying the roll 10, not only is it possible to specify a roll 10 which, as illustrated in (b) of FIG. 6, is configured so that a thickness distribution of an outer cylinder part 81 is monotonically inclined with respect to a y-axis, but it is also possible to specify (i) a roll 10 which, as illustrated in (d) of FIG. 6, is configured so that a thickness distribution of an outer cylinder part 81 is not inclined with respect to a y-axis and (ii) a roll 10 which, as illustrated in (e) of FIG. 6, is configured so that a thickness distribution is not monotonically inclined with respect to a y-axis. It is possible to likewise specify the roll 10 illustrated in (d) of FIG. 8.

Effect of Embodiment 1

Figure 9:
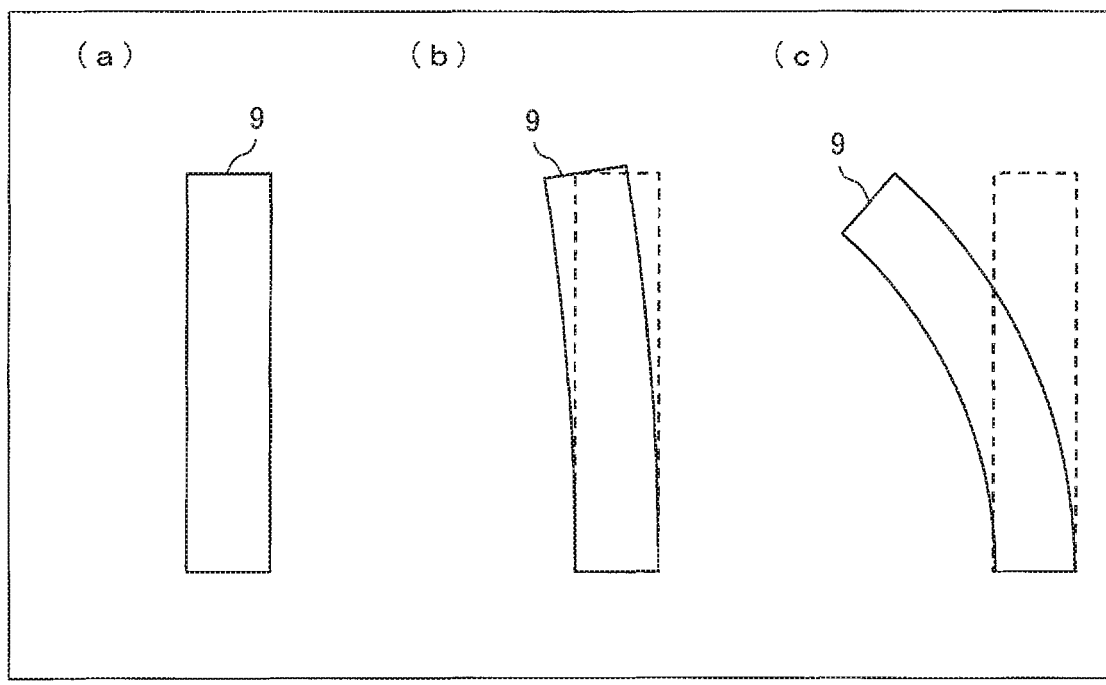
FIG. 9 is set of top views illustrating states of respective slit separators in cases where the slit separators are wound off from the corresponding rolls illustrated in FIG. 8.

FIG. 9 is a set of top views illustrating states of respective slit separators 9 in cases where the slit separators 9 are wound off from the rolls 10 illustrated in (b) through (d) of FIG. 8 and from rolls in a comparative example. (a) of FIG. 9 illustrates the state of the slit separator 9 in a case where the slit separator 9 is wound off from the roll 10 illustrated in (b) of FIG. 8. (b) of FIG. 9 illustrates the state of each of the slit separators 9 in the cases where the slit separators 9 are wound off from the respective rolls 10 illustrated in (c) and (d) of FIG. 8. (c) of FIG. 9 illustrates the state of each of slit separators 9 in the comparative example (described later) of (a) and (b) of FIG. 9.

As illustrated in (a) of FIG. 9, it has been confirmed that the slit separator 9 wound off from the roll 10 illustrated in (b) of FIG. 8 extends substantially straight. As illustrated in (b) of FIG. 9, it has also been confirmed that each of the slit separators 9 wound off from the respective rolls 10 illustrated in (c) and (d) of FIG. 8 bends more than the slit separator 9 (indicated by broken lines) illustrated in (a) of FIG. 9, but extends nearly straight.

Figure 10:
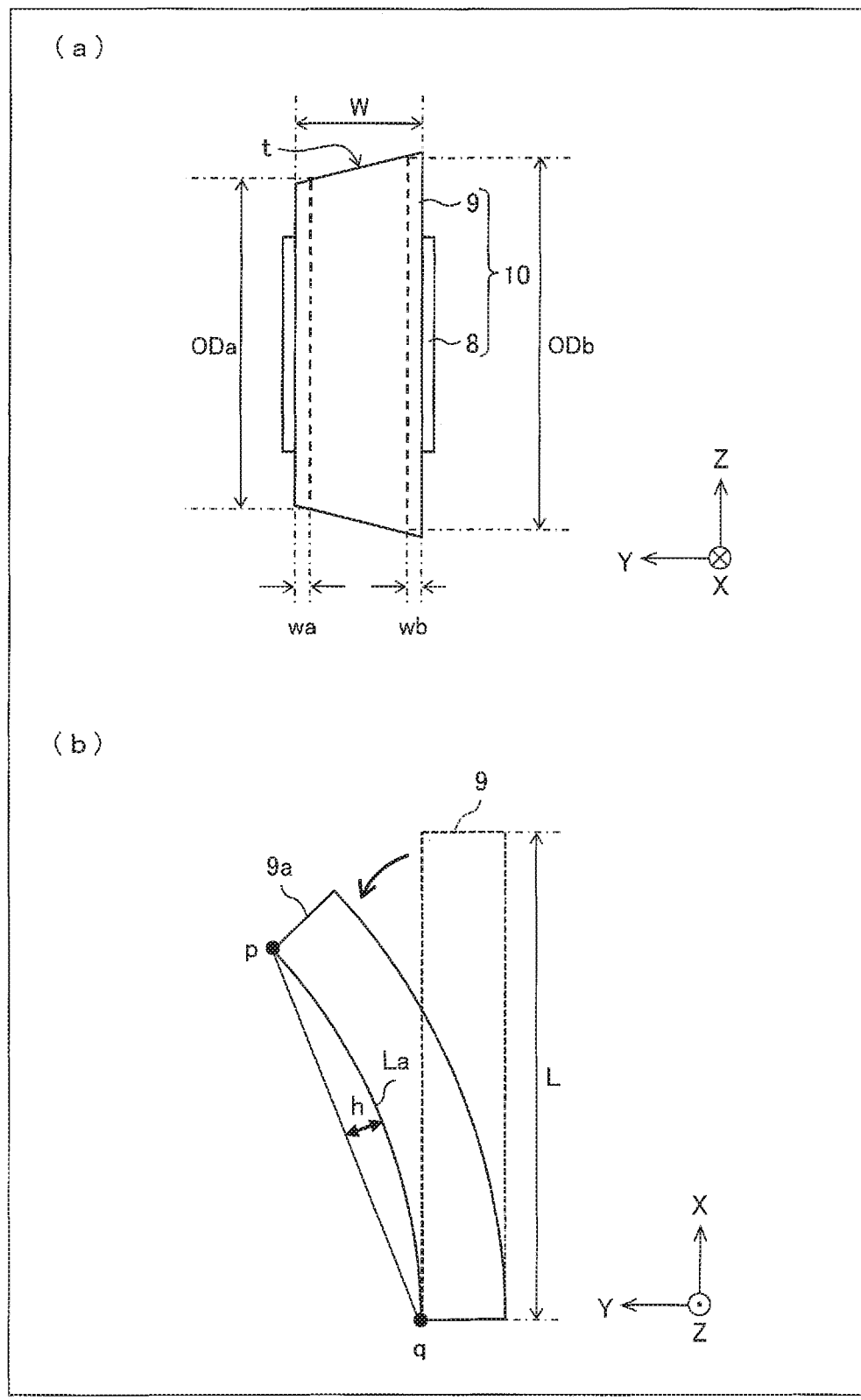
FIG. 10 is a schematic view for describing a method of testing a roll according to Embodiment 2.

An amount by which the slit separator 9 has been bent can be quantified by a distance h (see FIG. 10). A distance h of the sample 1 corresponding to the roll 10 illustrated in (b) of FIG. 8 is 1.8 mm. A distance h of the sample 2 corresponding to the roll 10 illustrated in (b) of FIG. 8 is 2.3 mm. A distance h of the sample 3 corresponding to the roll 10 illustrated in (c) of FIG. 8 is 4.8 mm. Each of these distances h is acceptable as a distance by which a lithium-ion secondary battery separator bends.

Comparative Example

As illustrated in (c) of FIG. 9, there are rolls, in each of which a slit separator 9 having been wound off is bent toward its thin part by a large amount. According to such a roll, a thick part of the slit separator 9 is stretched so as to be deformed. Higher rigidity of an outer cylinder part of a core of a roll tends to cause a slit separator 9 to be deformed by a larger amount. In a case where an outer cylinder part 81 has high rigidity, the outer cylinder part 81 is nearly unchanged from a state as illustrated in (a) of FIG. 8 even if a slit separator 9 is wound around a core 8.

(Use in Lithium-Ion Secondary Battery)

According to the lithium-ion secondary battery 1 illustrated in each of FIGS. 1 through 3, the slit separator 9 is processed so as to be accommodated in the lithium-ion secondary battery 1, and is then used as a separator 12. In the processing, the slit separators 9 illustrated in (a) and (b) of FIG. 9 are preferable to the slit separator 9 illustrated in (c) of FIG. 9. The slit separator 9 illustrated in (a) of FIG. 9 is preferable to the slit separator 9 illustrated in (b) of FIG. 9.

(Other Configurations and Effects)

During a step of producing an original sheet which is wound around the core c illustrated in (a) of FIG. 4 (i.e. during a step before the step illustrated in (a) of FIG. 4), a thickness distribution of the original sheet can be measured by use of a thickness measuring device. Then, the thickness distribution of the original sheet is reflected in a slit separator 9. This allows the slit separator 9 to be wound around an outer cylinder part 81 while it is made sure, by use of results of thickness measurement, that a thickness of the outer cylinder part 81 and a thickness of the slit separator 9 correspond to each other.

In addition, the slit separator 9 can be a porous film that is stretched along the center axis CA of the outer cylinder part 81. The center axis CA extends in the TD described above. That is, in a case where the slit separator 9 is stretched, the thickness distribution of the slit separator 9 may be inclined to the direction in which the slit separator 9 is stretched. The slit separator 9 can be wound around the outer cylinder part 81 while it is made sure, by use of the inclination of the thickness distribution, that the thickness of the outer cylinder part 81 and the thickness of the slit separator 9 correspond to each other.

Embodiment 2

Figure 11:
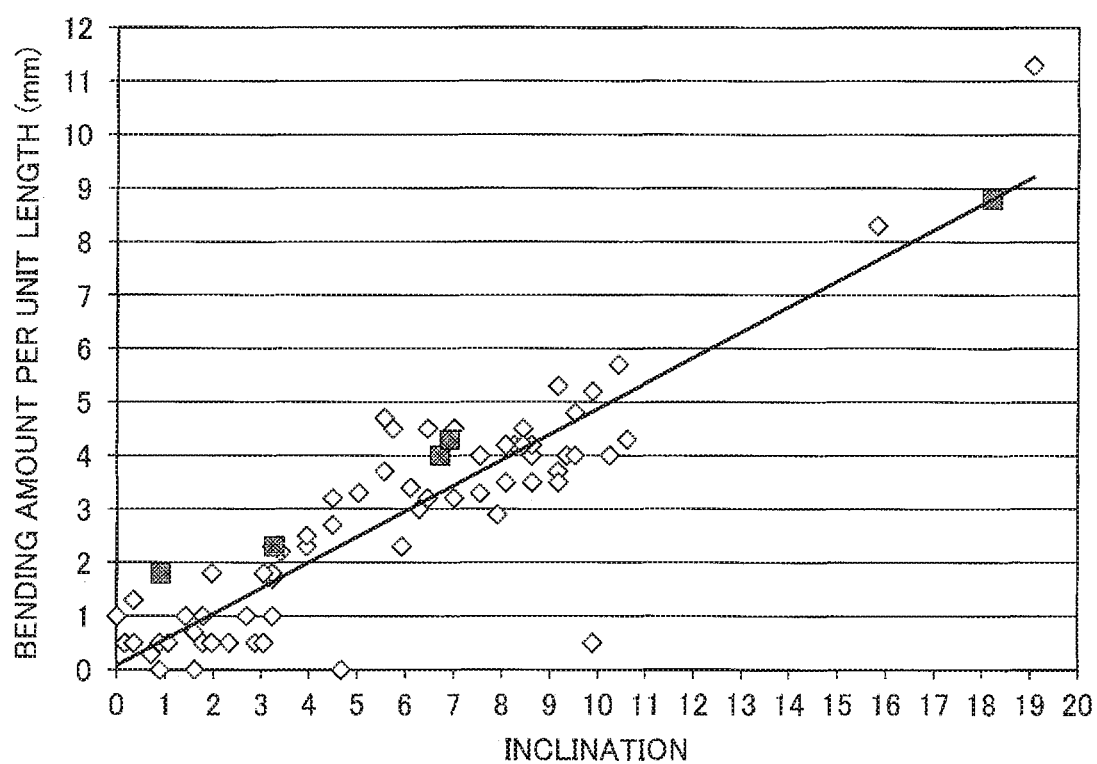
FIG. 11 is a graph showing a correlation between an inclination and a bending amount while the testing method described with reference to FIG. 10 is being carried out.

The following description will discuss Embodiment 2 of the present invention with reference to FIGS. 10 through 12. For convenience, members identical in function to the members described in Embodiment 1 will be given the same reference numbers, and will not be described. This also applied to the subsequent embodiments.

<<Roll Testing Method>>

As described above, a slit separator, which has been wound off from a roll having an inclined outer circumferential surface, bends toward a thin side of the slit separator. The inventors found that there is a correlation between (i) an inclination of an outer circumferential surface of a roll and (ii) an amount by which a slit separator wound off from the roll bends. By use of such a correlation, a roll can be tested as described below.

FIG. 10 is a schematic view for describing a method of testing a roll 10 according to Embodiment 2 of the present invention. (a) of FIG. 10 is a front view for describing an inclination of an outer circumferential surface t of a slit separator 9. (b) of FIG. 10 is a top view for describing an amount by which the slit separator 9 wound off from a roll 10 bends.

(Inclination of Outer Circumferential Surface of Roll)

The inclination of the outer circumferential surface t of the slit separator 9 can be represented by the following Formula (1):

$$|ODb - ODa|/(W - wa - wb) \quad \text{Formula (1)}$$

where: ODa is an outer diameter on a positive side of a y-axis of the roll 10 illustrated in (a) of FIG. 10; ODb is an outer diameter on a negative side of the y-axis; W is a product width of the slit separator 9; and wa and wb are each an end part width.

The outer diameter ODa is a diameter of part of the outer circumferential surface t, which part is located at a position that is away, by as much as the end part width wa, from an edge of the slit separator 9 at the positive side of the y-axis toward the negative side of the y-axis. The outer diameter ODb is a diameter of part of the outer circumferential surface t, which part is located at a position that is away, by as much as the end part width wb, from an edge of the slit separator 9 at the negative side of the y-axis toward the positive side of the y-axis. These diameters can be measured by a well-known method such as (i) the above described measuring method in which a slide caliper M is to be used and (ii) a non-contacting method in which a laser beam is to be used.

The product width W is a length of the slit separator 9 along the y-axis. The end part width wa is an end part length of the slit separator 9 along the y-axis, and is defined for properly measuring the outer diameter ODa. The end part width wb is an end part length of the slit separator 9 along the y-axis, and is defined for properly measuring the outer diameter ODb.

In a case where the end part width wa is small, the outer diameter ODa may not be properly measured. In a case where the end part width wb is small, the outer diameter ODb may not be properly measured. This is because the positions of the edges of the slit separator 9 along the y-axis shift. The end part width wa and wb are each to be defined so as to exceed a maximum amount by which each of the edges shifts (e.g. 3 mm).

(Bending Amount of Slit Separator Wound Off from Roll)

A bending amount by which a slit separator 9 wound off from a roll 10 bends is quantified by a distance h illustrated in (b) of FIG. 10. In a case where there is no longer a tensile force applied to wind the slit separator 9 off toward a positive side of the x-axis, the slit separator 9 thus wound off bends toward the positive side of the y-axis as is the case of a slit separator 9a illustrated in (b) of FIG. 10. The distance h is a maximum distance between (i) an edge La of the slit separator 9a, which edge La is located on the positive side of the y-axis and (ii) a line segment connecting a vertex p and a vertex q of the edge La.

The bending amount tends to become large in a case where a length L of the slit separator 9 having been wound off from the roll 10 is long.

(Correlation between Inclination and Bending Amount)

FIG. 11 is a graph showing a correlation between an inclination and a bending amount while the testing method described with reference to (a) and (b) of FIG. 10 is being carried out. The bending amount is measured per unit length (1000 mm) (i.e. in a case where the length L of the slit separator 9 is 1000 mm). A horizontal axis of FIG. 11 represents the inclination, and a vertical axis of FIG. 11 represents the bending amount (distance h).

Pieces of data shown by rhombic shapes indicate correlations between inclinations and corresponding bending amounts of 67 of rolls 10, in each of which a wound slit separator 9 has an average thickness of 16 μm. Pieces of data shown by squares indicate correlations between inclinations and corresponding bending amounts of 5 of rolls 10, in each of which a wound slit separator 9 has an average thickness of 20 μm.

As illustrated in FIG. 11, a relationship between x and y approximated by the least squares method is represented by the following Formula (2):

$$y = 0.479x + 0.0864 \quad \text{Formula (2)}$$

where: x is an inclination of data indicated by rhombic shapes; and y is a bending amount. Inclinations and corresponding bending amounts thus has positive correlations. That is, it is observed that a larger inclination causes a larger bending amount.

In other words, it can be understood that a larger inclination results in a larger bending amount. That is, a bending amount tends to be large in a case of (i) a roll in which a slit separator 9 having a large difference in average thickness between a reference surface and a back surface is wound or (ii) a roll in which a difference in accumulated thickness has become large due to the fact that a slit separator 9 having differing average thicknesses between a reference surface and a back surface is wound many times.

(Testing of Roll)

As illustrated in FIG. 11, relationships between inclinations and corresponding bending amounts of pieces of data shown by squares likewise show positive correlations. Therefore, without winding off a slit separator 9, it is possible to test whether or not a bending amount of a roll 10 is less than a prescribed threshold value.

For example, in a case where a bending amount is 6 mm, a linear expression of the Formula (2) indicates that an inclination is 12.346. Therefore, if an inclination of any given roll obtained by the Formula (1) is less than 12, then it is possible to judge that a bending amount of this roll is less than 6 mm.

Note, however, that if an average thickness (design thickness) of a slit separator 9 varies, then it causes variance in the amount by which an outer circumferential surface of a roll 10 rises in a case where the slit separator 9 is wound around a core 8 many times. Therefore, in a case where populations of inclination and bending amount vary, there is also variance in parameters of a line, which parameters are shown in the above Formula (2).

(Example of Measurement of Inclination and Bending Amount)

As described above, the distances h of the samples 1 through 3 are 1.8 mm, 2.3 mm, and 4.8 mm, respectively. The inclinations of the samples 1 through 3 are 0.91, 3.27, and 6.92, respectively.

(Details of Roll Testing Method)

FIG. 12 is a flow chart illustrating the method of testing the roll 10, which method is based on the correlation illustrated in FIG. 11.

As illustrated in FIG. 12, this method includes (i) a step S101 of identifying an inclination, (ii) a step S102 of identifying a bending amount, and (iii) a step S103 of judging whether or not the bending amount is less than a threshold (i.e. judging a film roll is a non-defective product).

(Step S101)

An inclination is identified based on the above described Formula (1). Specifically, the inclination to be identified is a value that is proportional to an absolute value (|Db−Da|) of a difference, per unit width of a slit separator 9, between (i) an outer diameter ODb of part of a roll 10, which part is on a negative side of a y-axis (i.e. one of directions in which a center axis CA of an outer cylinder part 81 extends) and (ii) an outer diameter ODa of part of the roll 10, which part is on the other side of the y-axis.

Note that a process of obtaining a value per unit width of the slit separator 9 corresponds to a process of division with the use of "W−wa−wb" in the Formula (1).

(Step S102)

A bending amount is identified based on the above described Formula (2). Specifically, based on a correlation between inclinations and bending amounts, the bending amount is identified with the use of the inclination identified in the step S101.

(Step S103)

It is judged whether or not the bending amount identified in the step S102 is less than a threshold (e.g. 6 mm). In a case where a result of the step S103 is YES, the roll 10 is judged as a non-defective product. In a case where the result of the step S103 is NO, the roll 10 is judged as a defective product. Alternatively, whether or not the roll 10 is a non-defective product can be judged by (i) obtaining, in advance, an inclination which corresponds to the threshold of a bending amount and then (ii) comparing the inclination identified in the step S101 with the inclination thus obtained in advance. In such a case, the step S102 does not need to be carried out.

Effect of Embodiment 2

A slit separator 9, which was wound around a roll 10 and then was wound off from the roll 10, is then processed so as to be a secondary product (e.g. lithium-ion secondary battery etc.). In so doing, the slit separator 9 wound off from the roll 10 is preferably not bent toward a direction in which the slit separator 9 was wound off.

According to Embodiment 2, a bending amount can be identified based on the correlation (see FIG. 11 and Formula (2)) between an inclination (see Formula (1)) and a bending amount, which correlation was found by the inventors. This makes it possible, without winding a slit separator 9 off from a roll 10, to judge whether or not a bending amount is less than a threshold, so as to judge whether or not the roll 10 is a non-defective product.

It tends to be complicated to wind a slit separator 9 off from a roll 10 and then to measure a bending amount with respect to a direction in which the slit separator 9 was wound off. In addition, conditions in which to wind a slit separator 9 off and to measure a bending amount tend to vary. This causes measured bending amounts to vary. However, by identifying an inclination, it is made possible to easily judge whether or not a roll 10 is a non-defective product without measuring a bending amount.

Embodiment 3

The following description will discuss Embodiment 3 of the present invention with reference to FIG. 13.

<<Roll Production Method>>

FIG. 13 is a flow chart illustrating a method of producing a roll 10 according to Embodiment 3.

As illustrated in FIG. 13, the method includes (i) a step S201 of identifying an orientation of an outer cylinder part 81 and (ii) a step S202 of winding a film around an outer circumferential surface s of the outer cylinder part 81.

(Step S201)

As illustrated in (b) of FIG. 6, an outer cylinder part 81 has a material thickness which is thinner at one end part toward a negative side of a y-axis than the other end part toward a positive side of the y-axis. In this step, the orientation of the outer cylinder part 81 is identified by identifying which of the end parts of the outer cylinder part 81 is smaller in material thickness.

The orientation of the outer cylinder part 81 can be identified by identifying which of the parts has the mark S illustrated in (a) of FIG. 7. In the example shown in (b) of FIG. 6, the material thickness of the outer cylinder part 81 is thinner at a part of the outer cylinder part 81 toward the negative side of the y-axis, which part is provided with the mark S. Then, the orientation of the outer cylinder part 81 can be identified by measuring an outer diameter of the outer cylinder part 81 with the use of a slide caliper M as illustrated in (b) of FIG. 7.

(Step S202)

In the step S201, the orientation of the outer cylinder part 81 was identified. Therefore, it is already known which of the end parts of the outer cylinder part 81 is smaller in material thickness. Based on this knowledge, a slit separator 9 is wound around the outer circumferential surface s of the outer cylinder part 81 so that a side of the outer cylinder part 81, which side is smaller in material thickness than the other side, corresponds to a side of the slit separator 9, which side is smaller in thickness than the other side. It is possible to cause the orientation of the slit separator 9 to correspond to that of the core 8 during slitting. Alternatively, it is possible to cause the orientation of the slit separator 9 to correspond to that of the core 8 while the slit separator 9, which was wound around a core 8, is wound around another core.

Effect of Embodiment 3

According to a roll 10 as described above, one end part of an outer cylinder part 81 is thinner and therefore less rigid than the other end part. An amount by which the outer cylinder part 81 is bent toward the inside is a larger at this one end part where rigidity is low than at the other end part. Then, since the thicker part of the slit separator 9 is wound around the one end part which is bent toward the inside by a large amount, an inclination of an outer circumferential surface t with respect to a widthwise axis is restricted.

Variation

The number of ribs 831 through 838 illustrated in (a) of FIG. 6 is not limited to eight. For example, the scope of the present invention also encompasses a roll which includes an odd number of ribs.

a configuration in a case where the outer cylinder part 181 is elastically deformed.

Figure 15:
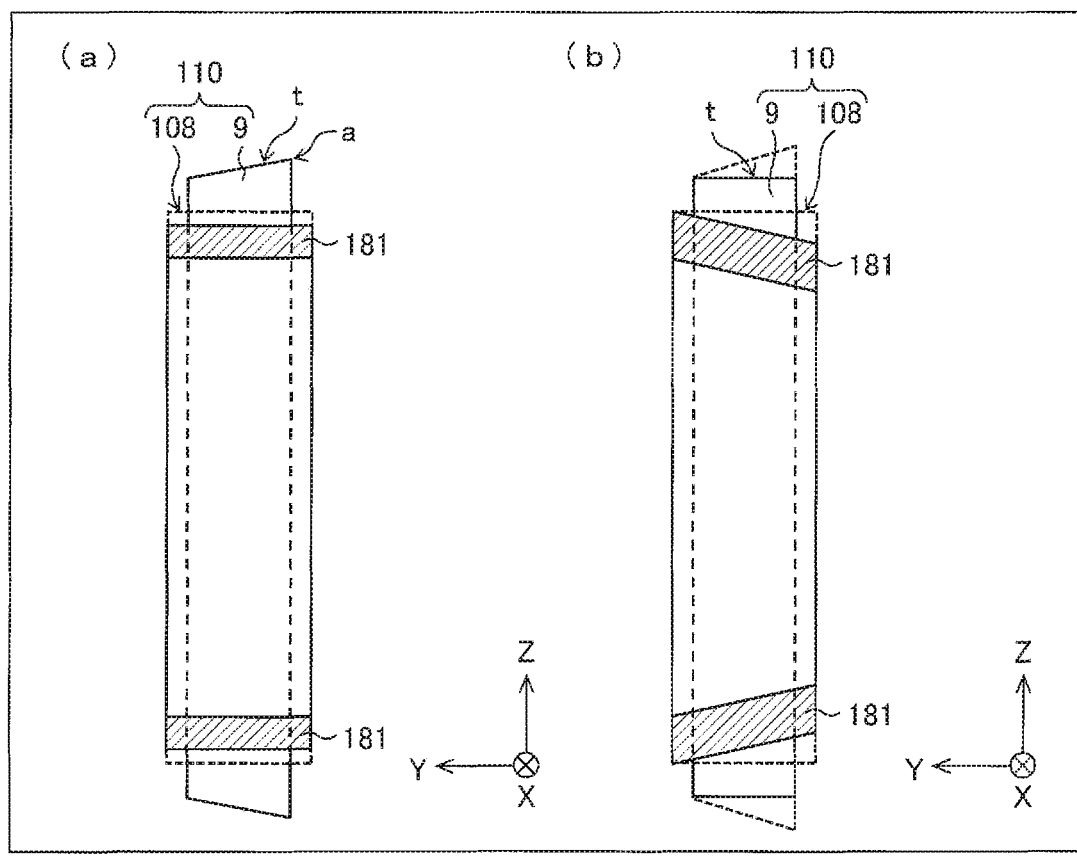
FIG. 15 is a set of cross-sectional views each illustrating a configuration of a roll in which a slit separator is wound around the core of Embodiment 4.

As illustrated in (a) of FIG. 15, in a case where (i) the thickness of the slit separator 9 is thick toward a negative side of a y-axis and (ii) the outer cylinder part 181 is not elastically deformed, a surface of the roll 110 is not inclined, but rises at a part a located toward the negative side of the y-axis.

As illustrated in (b) of FIG. 15, in an actual case, the outer cylinder part 181 around which the slit separator 9 is wound is deformed toward the inside due to elasticity. This causes an inclination of the outer circumferential surface t of the slit separator 9 in the case illustrated in (b) of FIG. 15 to be more restricted than is the case of (a) of FIG. 9. The principle of restriction of inclination in this case is similar to that described in Embodiment 1.

TABLE 5

| | Unit: mm | | | | | |
|---|---|---|---|---|---|---|
| | Sample 4 | | | Sample 5 | | |
| | RS | BS | Difference | RS | BS | Difference |
| AT | 0.0198 | 0.0192 | 0.0006 | 0.0181 | 0.0169 | 0.0012 |
| Core Cir. (before winding) | 277.83 | 277.78 | 0.05 | 291.68 | 291.64 | 0.04 |
| AMT | 6.03 | 6.04 | −0.01 | 8.10 | 8.11 | −0.02 |
| Core Cir. (after winding) | 276.79 | 276.96 | −0.18 | 290.64 | 290.72 | −0.07 |
| Roll Diameter | 138.70 | 138.51 | 0.19 | 148.73 | 149.16 | −0.43 |
| Accu. T | 50.60 | 50.35 | 0.25 | 56.21 | 56.62 | −0.41 |
| CCA | 1.04 | 0.82 | 0.22 | 1.04 | 0.92 | 0.12 |

Abbreviations:
AT: Average Thickness
Core Cir.: Core circumference
AMT: Average Material Thickness
Accu. T: Accumulative Thickness
CCA: Circumference Changing Amount Embodiment 4

Figure 14:
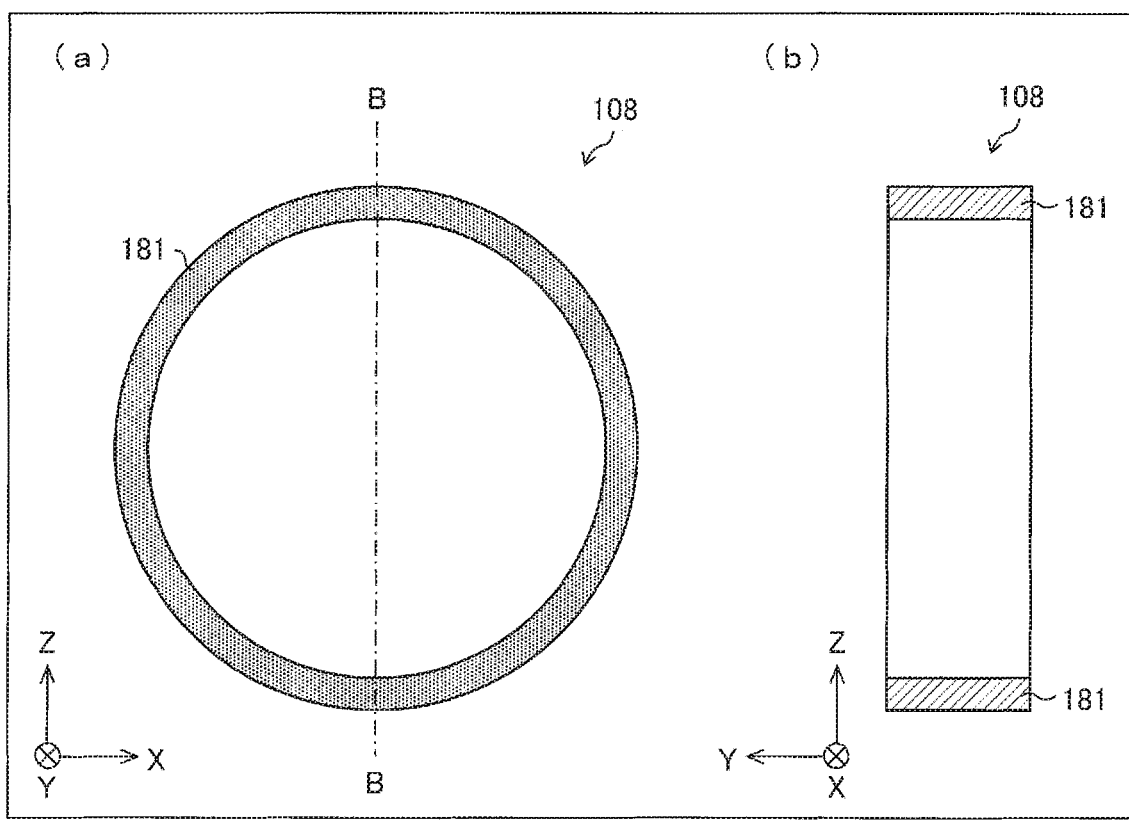
FIG. 14 is a view illustrating a configuration of a core used in Embodiment 4.
Figure 16:
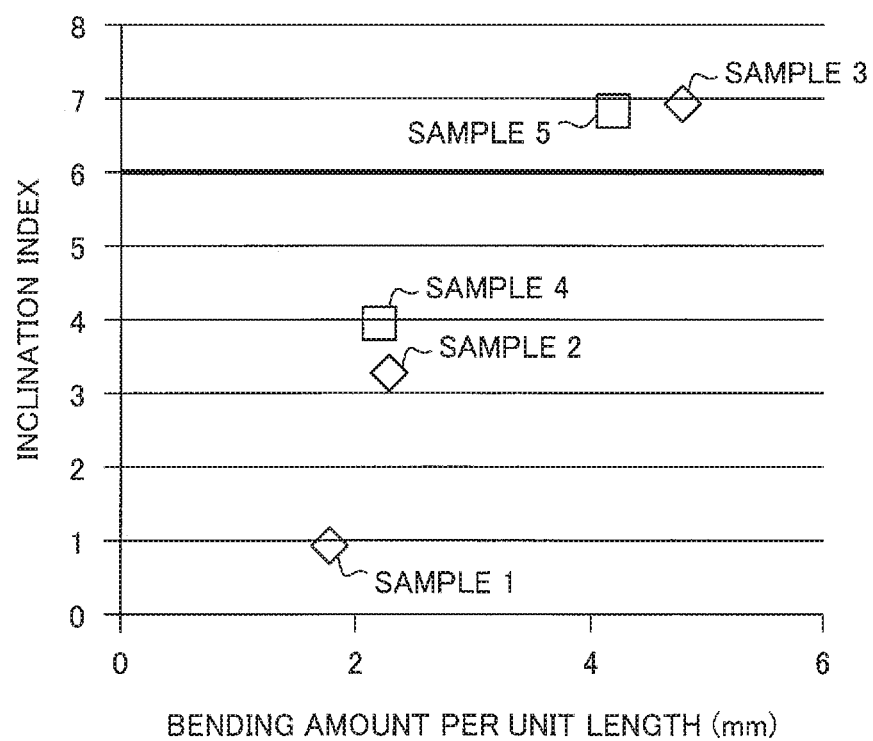
FIG. 16 is a graph showing a relationship between bending amounts and corresponding inclination indexes.

The following description will discuss Embodiment 4 of the present invention with reference to FIGS. 14 through 16.

<<Configuration of Roll>>

FIG. 14 is a view illustrating a configuration of a core 108 used in Embodiment 4. X, Y, and Z axes shown in (a) of FIG. 14 correspond to X, Y, and Z axes shown in (b) of FIG. 14, respectively.

(a) of FIG. 14 is a front view of the core 108. In comparison with the core 8 of Embodiment 1, the core 108 includes an outer cylinder part 181 while including no ribs or inner cylinder parts. That is, the core 108 has a single cylinder structure including only the outer cylinder part 181.

(b) of FIG. 14 is a cross-sectional view illustrating a cross section taken along the line B-B shown in (a) of FIG. 14. As is understood from (b) of FIG. 14, the outer cylinder part 181 is flat and has a thickness which is entirely uniform. This causes end parts of the core 108 to have no difference in structure and strength (rigidity) therebetween or to have a negligible difference in structure and strength (rigidity) therebetween.

FIG. 15 is a set of cross-sectional views each illustrating a configuration of a roll 110 in which a slit separator 9 is wound around the core 108 of Embodiment 4. (a) of FIG. 15 illustrates a configuration in a case where the outer cylinder part 181 is not elastically deformed. (b) of FIG. 15 illustrates Table 5 shows circumferences and the like of cores 108 which were measured before and after slit separators 9 were wound. As shown in Table 5, circumferences and the like of two samples 4 and 5 of the core 108 were measured. The circumferences and the like of a reference surface and a back surface of each of the samples were measured. The rows in Table 5 are identical to those of Table 4.

As shown in Table 5, the samples 4 and 5 differ in average material thickness of the outer cylinder part 181. The sample 4 is structured so that the average material thickness of the outer cylinder part 181 is thinner than that of the sample 5 by approximately 2 mm. This causes the sample 4 to be relatively weaker in rigidity than the sample 5, and consequently causes an amount of elastic deformation in a case where a slit separator 9 is wound is to be larger. In particular, an amount of elastic deformation on a reference surface side of the sample 4 is larger than that of the sample 5.

Consequently, as is understood from Table 5, an amount of difference between circumferences of the reference surface and a back surface of the core 108 varies between before and after winding of the slit separator 9 by a larger amount in the sample 4 than in the sample 5.

TABLE 6

|  | Sample 1 | Sample 2 | Sample 3 | Sample 4 | Sample 5 |
|---|---|---|---|---|---|
| Inclination Index | 0.91 | 3.27 | 6.92 | 3.96 | 6.83 |
| Bending amount per unit length (distance h, mm) | 1.8 | 2.3 | 4.8 | 2.2 | 4.2 |

Table 6 shows inclination indexes and bending amounts of the cores 8 of respective of the samples 1 through 3 of Embodiment 1 and those of the cores 108 of respective of the samples 4 and 5 of Embodiment 4. Each of the inclination indexes and the bending amounts was measured after a slit separator 9 was wound.

The "inclination index" row in Table 6 deals with indexes, each of which (i) indicates an inclination of an outer circumferential surface of a slit separator 9 and (ii) is represented by the following Expression (3):

$$|D1-D2|/W \quad \text{Expression (3)}$$

where: D1 is an outer diameter of one end part of the slit separator 9 wound around a core 108; D2 is an outer diameter of the other end part; and W is a product width of the slit separator 9.

For convenience, it is possible to (i) measure (a) an outer diameter ODa of a part that is away from an edge of one end part of the slit separator 9 by as much as an end part width wa and (b) an outer diameter ODb of a part that is away from an edge of the other end part of the slit separator 9 by as much as an end part width wb and then (ii) designate, as an inclination index, a value obtained by use of the above described Formula (1).

The "bending amount per unit length" row in Table 6 deals with lengths, each of which is a distance h of (b) of FIG. 10 per unit length (1000 mm) of the slit separator 9 (i.e. in a case where the length L of the slit separator 9 is 1000 mm).

As shown in Table 6, (i) the inclination index of the sample 4 is smaller than that of the sample 5 and (ii) the bending amount of the slit separator 9 of the sample 4 is more restricted than that of the sample 5. This is presumably because the outer cylinder part 181 is subjected to an elastic deformation, so that a thickness difference of the slit separator 9 is cancelled out.

As shown in Table 5, the values of the "average thickness" of the samples 4 and 5 are each larger on a reference surface than on a back surface, the values of the "core circumference (after winding)" of the samples 4 and 5 are each smaller on a reference surface than on a back surface. With the use of these relationships of the values of "average thickness" and "core circumference (after winding)", it is possible to specify the roll 110 illustrated in (b) of FIG. 15, as is the case of the samples 1 and 2 described in Embodiment 1.

Specifically, it is possible to specify a roll 110 as a film roll which (i) includes a core 108 and a slit separator 9, the core 108 including an outer cylinder part 181 that has an outer circumferential surface s around which the slit separator 9 is to be wound, and the slit separator 9 having been wound around the outer circumferential surface s and having a thickness that is larger toward one end part of the slit separator 9 than it is toward the other end part and (ii) is configured so that a circumference of one end part of the outer circumferential surface s is shorter than a circumference of the other end part of the outer circumferential surface s while the slit separator 9 is being wound.

It is thus possible to specify the roll 110 of Embodiment 4 as is the case of the roll 10 of Embodiment 1, the roll 110 having a single cylinder structure and including a core 108, such as those of the samples 4 and 5, which is configured so that a thickness distribution of an outer cylinder part 181 is not inclined with respect to a y-axis, the roll 10 having a double cylinder structure in which the roll 10 includes an outer cylinder part 81, an inner cylinder part 82, ribs 831 through 838, and a core 8, such as those of the samples 1 and 2, which is configured so that a thickness distribution of the outer cylinder part 81 is inclined with respect to the y-axis.

Effect of Embodiment 4

The bending amount of the slit separator 9 wound around the sample 4 is restricted by an amount approximating that of the slit separator 9 wound around the sample 2 shown in Table 6. This means that the bending amount is restricted so much that there is no problem in utilizing the slit separator 9 as a lithium-ion secondary battery separator.

Therefore, the following advantageous effect is produced: It is possible to restrict a plastic deformation of a slit separator so as to restrict bending as with Embodiment 1, even in a case of a core having a single cylinder structure in which (i) an outer cylinder part is flat to have a uniform material thickness and (ii) the core includes no ribs or inner cylinder part.

FIG. 16 is a graph showing a relationship between bending amounts and corresponding inclination indexes. In FIG. 16, (i) a horizontal axis represents a bending amount per unit length (1000 mm) (i.e. in a case where a length L of a slit separator 9 is 1000 mm) and (ii) a vertical axis represents an inclination index.

FIG. 16 indicates that, as is the case of FIG. 11, (i) there is a correlation between an inclination index and a bending amount and (ii) a smaller inclination index (inclination) causes a bending amount of a slit separator 9 to be more restricted. By making a comparison between a group of the samples 1, 2, and 4 and a group of the samples 3 and 5, it can be observed that bending amounts of slit separators 9 wound around the respective samples significantly differ between the two groups.

In view of the use of a slit separator 9 as a lithium-ion secondary battery separator, a bending amount per unit length of the slit separator 9 is preferably 3 mm or less. Therefore, an inclination index, which represents an inclination of an outer circumferential surface of the slit separator 9 with respect to a center axis of a core 8 or core 108, is preferably 6 or less.

Therefore, in a case where an inclination index is used to test whether or not a slit separator 9 is a non-defective product, the test is preferably carried out while a threshold is set to 6.

As described above, even in a case where a bending amount (distance h) of a slit separator 9 is 4.8 mm, such a bending amount is acceptable as a distance by which a lithium-ion secondary battery separator bends.

However, if there is meandering of a separator which is wound off during a step of assembling a battery, then there may occur a misalignment between a positive electrode and a negative electrode while the separator is to be provided. This may cause short-circuiting between the positive electrode and the negative electrode.

In a case where a battery is assembled by hand or where a battery is assembled while a separator is conveyed at low speed, the distance h of a relatively high value such as 4.8 mm is acceptable. However, in a case where a separator is provided between a positive electrode and a negative electrode while the separator is conveyed at high speed so as to increase productivity of battery production, the separator is more likely to meander. In this case, therefore, the distance h is preferably 3 mm or less.

Note that Embodiment 4 discussed the roll 110 which includes the core 108 in which the outer cylinder part 181 is flat so as to have a uniform thickness. Alternatively, as is the case of the above described core 8 illustrated in (b) of FIG. 6, the core 108 can be configured so that the thickness of the outer cylinder part 181 is inclined on a reference surface and a back surface. Alternatively, the outer cylinder part 181 can have a thickness distribution which, as illustrated in (e) of FIG. 6, is not monotonically inclined with respect to a y-axis.

Summary

A film roll according to an aspect of the present invention includes: a cylindrical member having one end part and the other end part, the one end part being smaller in material thickness than the other end part; and a film which is wound around an outer circumferential surface of the cylindrical member, the film having a thickness that is larger toward the one end part than it is toward the other end part with respect to a widthwise axis.

The cylindrical member becomes bent toward the inside due to elasticity in a case where the film is wound around the cylindrical member.

According to the configuration, one end part of the cylindrical member is thinner and therefore less rigid than the other end part of the cylindrical member. An amount by which the cylindrical member is bent toward the inside is a larger at this one end part where rigidity is lower than at the other end part. Then, since a thicker part of the film is wound around the one end part which is bent toward the inside by a large amount, an inclination of the outer circumferential surface with respect to a widthwise axis is restricted.

Note that the "one end part" and the "other end part" refer to one side and the other side of a center axis of the cylindrical member, respectively.

The film roll can be configured so that the cylindrical member is made of a material containing any one of the following: ABS resin, polyethylene resin, polypropylene resin, polystyrene resin, polyester resin, and vinyl chloride resin.

The cylindrical member can be produced by resin molding in which a mold is used. In so doing, by employing a mold having one end part which is thinner than the other end part, it is made possible to mold the cylindrical member so that the one end part of the cylindrical member is thinner than the other end part of the cylindrical member.

The film roll can be configured so that the film is a porous film which is stretched along a center axis of the cylindrical member.

In general, a film has a thickness distribution that is not flat with respect to a widthwise axis. In particular, a thickness distribution of a porous film is larger than that of a non-porous film. Particularly a porous film, which is produced so as to be stretched along a widthwise axis, has a thickness distribution that is large with respect to the widthwise axis.

According to the configuration, the film is stretched. This causes the thickness distribution of the film to be inclined to one side of a cylinder around which the film is wound. The film can be wound around the cylindrical member while it is made sure, by use of the inclination of the thickness distribution, that the thickness of the cylindrical member and the thickness of the film correspond to each other.

The film roll according to the aspect of the present invention can further include a plurality of support members provided at intervals so as to support the outer circumferential surface of the cylindrical member from an inside of the cylindrical member.

According to the configuration, the film can be wound around the outer circumferential surface more firmly than is a case where no support members are provided. In addition, at a part of the outer circumferential surface between the support members, the one end part of the cylindrical member is bent toward the inside by a larger amount than is the other end part. This (i) allows a misalignment during winding of a film to be restricted and (ii) allows an inclination of the outer circumferential surface with respect to a widthwise axis to be restricted.

A film roll according to an aspect of the present invention includes: a core having an outer circumferential surface that is cylindrically shaped, the outer circumferential surface being configured so that a force, which is applied to the outer circumferential surface so as to shorten a circumference of the outer circumferential surface, causes a circumference of one end part of the core to be shorter than a circumference of the other end part of the core; and a film which is wound around the outer circumferential surface of the core, the film having a thickness that is larger toward the one end part than it is toward the other end part with respect to a widthwise axis.

A film roll according to an aspect of the present invention includes: a core having an outer circumferential surface around which a film is to be wound; and a film which is wound around the outer circumferential surface of the core, the film having a thickness that is larger toward one end part of the core than it is toward the other end part of the core with respect to a widthwise axis, the outer circumferential surface of the core being configured so that a circumference of the one end part is shorter than a circumference of the other end part.

According to the configuration, the thickness of the film thus wound is larger toward the one end part than it is toward the other end part, and the circumference of the outer circumferential surface of the core is shorter toward the one end part than it is toward the other end part. This causes the difference in thickness and the difference in circumference to offset each other, and consequently causes an inclination of the outer circumferential surface of the roll, which inclination occurs due to the difference in thickness of the film, to be restricted.

The film roll according to the aspect of the present invention is preferably configured so that the following formula is satisfied:

$$|D1-D2|/W \le 6$$

where: D1 is an outer diameter of one end part of the film wound around the cylindrical member; D2 is an outer diameter of the other end part of the film wound around the cylindrical member; and W is a width of the film.

According to the configuration, an amount of bending of the film, which bending occurs due to a plastic deformation of the film, can be made small.

A film roll production method according to an aspect of the present invention is a method of producing a film roll, including the steps of: identifying an orientation of a cylindrical member having one end part and the other end part, the one end part being smaller in material thickness than the other end part; and winding a film around an outer circumferential surface of the cylindrical member, the film having a thickness that is larger toward the one end part than it is toward the other end part with respect to a widthwise axis.

A film roll testing method according to an aspect of the present invention is a method of testing a film roll, said film roll including: a cylindrical member; and a film which is wound around the cylindrical member, said method including the steps of: identifying an inclination of an outer circumferential surface of the film roll with respect to a center axis of the cylindrical member; and judging, based on the inclination thus identified, whether or not the film roll is a non-defective product.

The film, which was wound around the film roll and was then wound off from the film roll, is then processed so as to be a secondary product. In so doing, a bending amount of the film thus wound off from the film roll is preferably small.

The inventors found that there is a correlation between (i) an inclination of an outer circumferential surface of a film roll with respect to a center axis of a cylindrical member and (ii) an amount by which a film wound off from the film roll bends.

With the configuration, whether or not the film roll is a non-defective product can be tested based on the inclination without winding the film off from the film roll.

It tends to be complicated to wind a slit separator off from a film roll and then to measure a bending amount with respect to a direction in which the slit separator was wound off. In addition, conditions in which to wind a slit separator off and to measure a bending amount tend to vary. This causes measured bending amounts to vary. However, by identifying an inclination, it is made possible to easily judge whether or not a film roll is a non-defective product without measuring a bending amount.

Additional Remarks

The present invention is not limited to the embodiments, but can be altered by a skilled person in the art within the scope of the claims. An embodiment derived from a proper combination of technical means each disclosed in a different embodiment is also encompassed in the technical scope of the present invention.

INDUSTRIAL APPLICABILITY

The present invention is applicable to (i) batteries for use in devices such as personal computers, mobile phones, and mobile information terminals, (ii) moving bodies such as automobiles and airplanes, and (iii) stationary batteries contributing to stable power supply. The present invention is also applicable to a method of producing the batteries, the moving bodies, and the stationary batteries.

REFERENCE SIGNS LIST

4 Heat-resistant layer
5 Porous film (film)
6 Slitting apparatus
8, 108 Core
9, 9a Slit separator (film)
10, 110 Roll
12 Separator (film)
81, 181 Outer cylinder part (cylindrical member)
82 Inner cylinder part
831 through 838 Rib (support member)
CA Center axis
Da, Db Mold
ODa, ODb Outer diameter
S Mark
S101 Step (step of identifying inclination)
S103 Step (step of judging whether or not film roll is non-defective product)
S201 Step (step of identifying orientation of cylindrical member)
S202 Step (step of winding film around outer circumferential surface of cylindrical member)
s Outer circumferential surface (outer circumferential surface of cylindrical member, outer circumferential surface of core)
t Outer circumferential surface

The invention claimed is:

1. A film roll comprising:
a cylindrical member having one end part and the other end part, the one end part being smaller in material thickness than the other end part; and
a film which is wound around an outer circumferential surface of the cylindrical member, the film having a thickness that is larger toward the one end part than it is toward the other end part with respect to a widthwise axis.

2. The film roll as set forth in claim 1, wherein the cylindrical member is made of a material containing any one of the following: ABS resin, polyethylene resin, polypropylene resin, polystyrene resin, polyester resin, and vinyl chloride resin.

3. The film roll as set forth in claim 1, wherein the film is a porous film which is stretched along a center axis of the cylindrical member.

4. A film roll as set forth in claim 1, further comprising: a plurality of support members provided at intervals so as to support the outer circumferential surface of the cylindrical member from an inside of the cylindrical member.

5. The film roll as set forth in claim 1, wherein the following formula is satisfied:

$$|D1-D2|/W \leq 6$$

where: D1 is an outer diameter of the one end part of the film wound around the cylindrical member; D2 is an outer diameter of the other end part of the film wound around the cylindrical member; and W is a width of the film.

6. A film roll comprising:
a core having an outer circumferential surface that is cylindrically shaped, the outer circumferential surface being configured so that a force, which is applied to the outer circumferential surface so as to shorten a circumference of the outer circumferential surface, causes a circumference of one end part of the core to be shorter than a circumference of the other end part of the core; and
a film which is wound around the outer circumferential surface of the core, the film having a thickness that is larger toward the one end part than it is toward the other end part with respect to a widthwise axis.

7. A film roll comprising:
a core having an outer circumferential surface around which a film is to be wound; and
the film which is wound around the outer circumferential surface of the core, the film having a thickness that is larger toward one end part of the core than it is toward the other end part of the core with respect to a widthwise axis, the outer circumferential surface of the core being configured so that a circumference of the one end part is shorter than a circumference of the other end part.

8. A method of producing a film roll, comprising the steps of:

identifying an orientation of a cylindrical member having one end part and the other end part, the one end part being smaller in material thickness than the other end part; and winding a film around an outer circumferential surface of the cylindrical member, the film having a thickness that is larger toward the one end part than it is toward the other end part with respect to a widthwise axis.

* * * * *